(12) United States Patent
Nam et al.

(10) Patent No.: US 11,312,606 B2
(45) Date of Patent: Apr. 26, 2022

(54) WATER PURIFIER AND METHOD FOR CONTROLLING THE SAME

(71) Applicant: LG ELECTRONICS INC., Seoul (KR)

(72) Inventors: Hyeunsik Nam, Seoul (KR); Duchan Ki, Seoul (KR); Bongjin Kim, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/975,519

(22) PCT Filed: Mar. 26, 2019

(86) PCT No.: PCT/KR2019/003524
§ 371 (c)(1),
(2) Date: Aug. 25, 2020

(87) PCT Pub. No.: WO2019/194453
PCT Pub. Date: Oct. 10, 2019

(65) Prior Publication Data
US 2021/0032085 A1    Feb. 4, 2021

(30) Foreign Application Priority Data

Apr. 5, 2018  (KR) .................. 10-2018-0039908

(51) Int. Cl.
*B67D 1/00*    (2006.01)
*B67D 1/08*    (2006.01)

(52) U.S. Cl.
CPC ......... *B67D 1/0014* (2013.01); *B67D 1/0867* (2013.01)

(58) Field of Classification Search
CPC .. B67D 1/0014; B67D 1/0867; B67D 1/0884; B67D 1/0859; B67D 1/0888; B67D 2210/00104; B67D 2210/00163; B67D 2210/0001; C02F 1/001; C02F 2370/10
USPC .... 222/1, 146.1, 146.2, 146.6, 129.1, 185.1; 62/389–396; 137/322
See application file for complete search history.

(56) References Cited

U.S. PATENT DOCUMENTS

| | | | | |
|---|---|---|---|---|
| 1,960,975 A | * | 5/1934 | Mulch | B67D 1/0009 62/319 |
| 4,335,836 A | * | 6/1982 | Harvill | B67D 1/0021 222/108 |

(Continued)

FOREIGN PATENT DOCUMENTS

| | | |
|---|---|---|
| JP | 2017-124849 | 7/2017 |
| KR | 10-2011-0007417 | 1/2011 |

(Continued)

OTHER PUBLICATIONS

International Search Report dated Jul. 8, 2019 issued in Application No. PCT/KR2019/003524.

*Primary Examiner* — Lien M Ngo
(74) *Attorney, Agent, or Firm* — Ked & Associates LLP

(57) ABSTRACT

Provided is a water purifier. The water purifier includes an agitator configured to agitate cooling water and heat-exchange the cooling water with a cooling coil, a motor coupled to the agitator to allow the agitator to rotate, the agitator operating at at least two rotational speeds other than zero, and a control assembly configured to control the rotational speed of the motor.

17 Claims, 12 Drawing Sheets

(56) References Cited

U.S. PATENT DOCUMENTS

| | | | | |
|---|---|---|---|---|
| 4,545,505 A | * | 10/1985 | Mueller | B67D 1/0864 222/146.6 |
| 5,280,711 A | * | 1/1994 | Motta | F25D 31/003 62/177 |
| 5,314,091 A | * | 5/1994 | Credle, Jr. | B67D 1/0021 222/129.1 |
| 5,617,736 A | * | 4/1997 | Ito | B67D 1/0864 222/146.6 |
| 6,044,903 A | * | 4/2000 | Heilman | A01K 63/042 165/263 |
| 6,438,989 B1 | * | 8/2002 | Wolski | B67D 1/0864 62/299 |
| 8,387,826 B2 | * | 3/2013 | Tsubouchi | B67D 1/0888 222/23 |
| 10,266,381 B2 | * | 4/2019 | Kim | B67D 1/0895 |
| 2017/0153056 A1 | | 6/2017 | Kim et al. | |

FOREIGN PATENT DOCUMENTS

| KR | 10-2012-0140417 | 12/2012 |
|---|---|---|
| KR | 10-2016-0066351 | 6/2016 |
| KR | 10-2017-0063452 | 6/2017 |

\* cited by examiner

[Fig. 1]
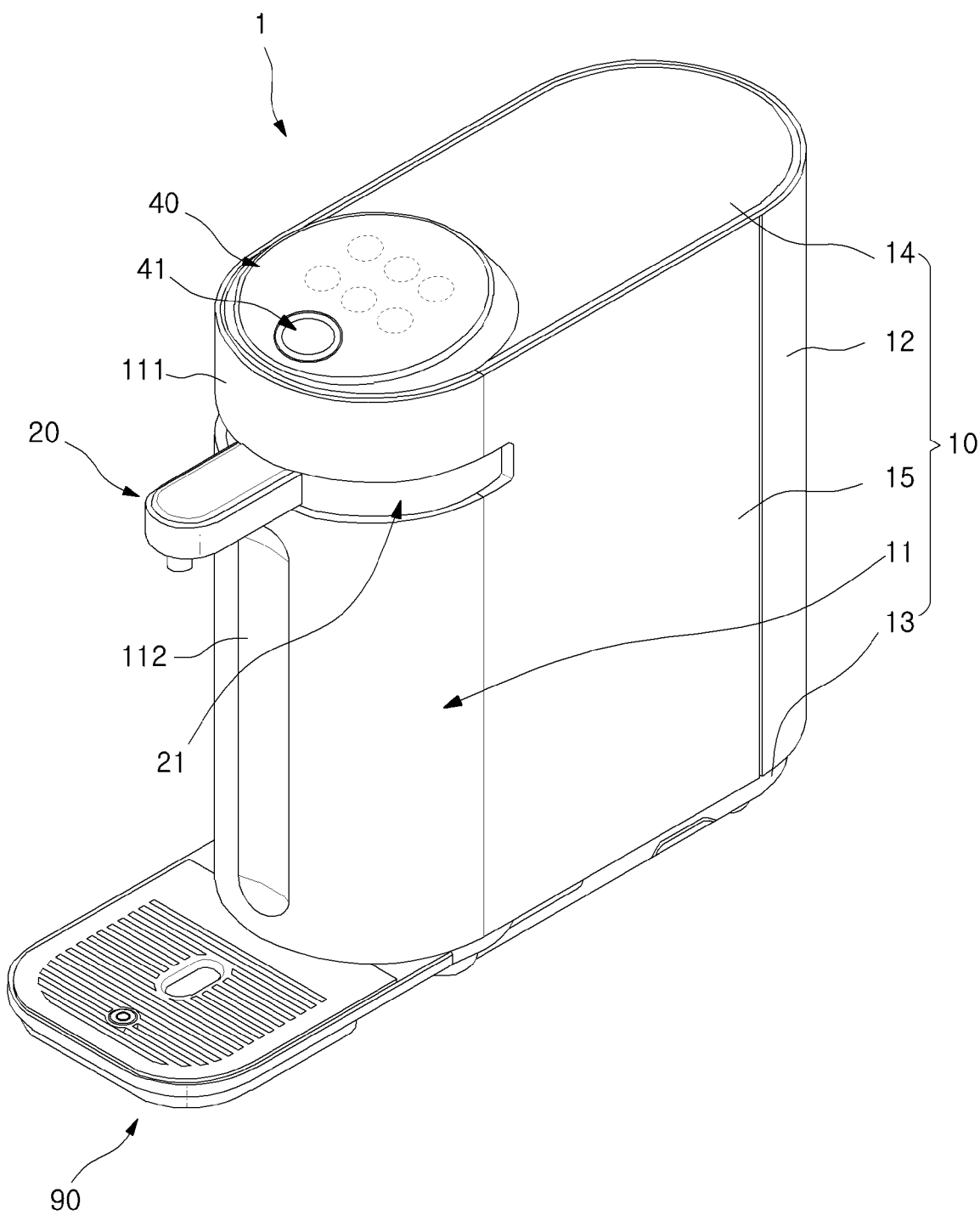

[Fig. 2]
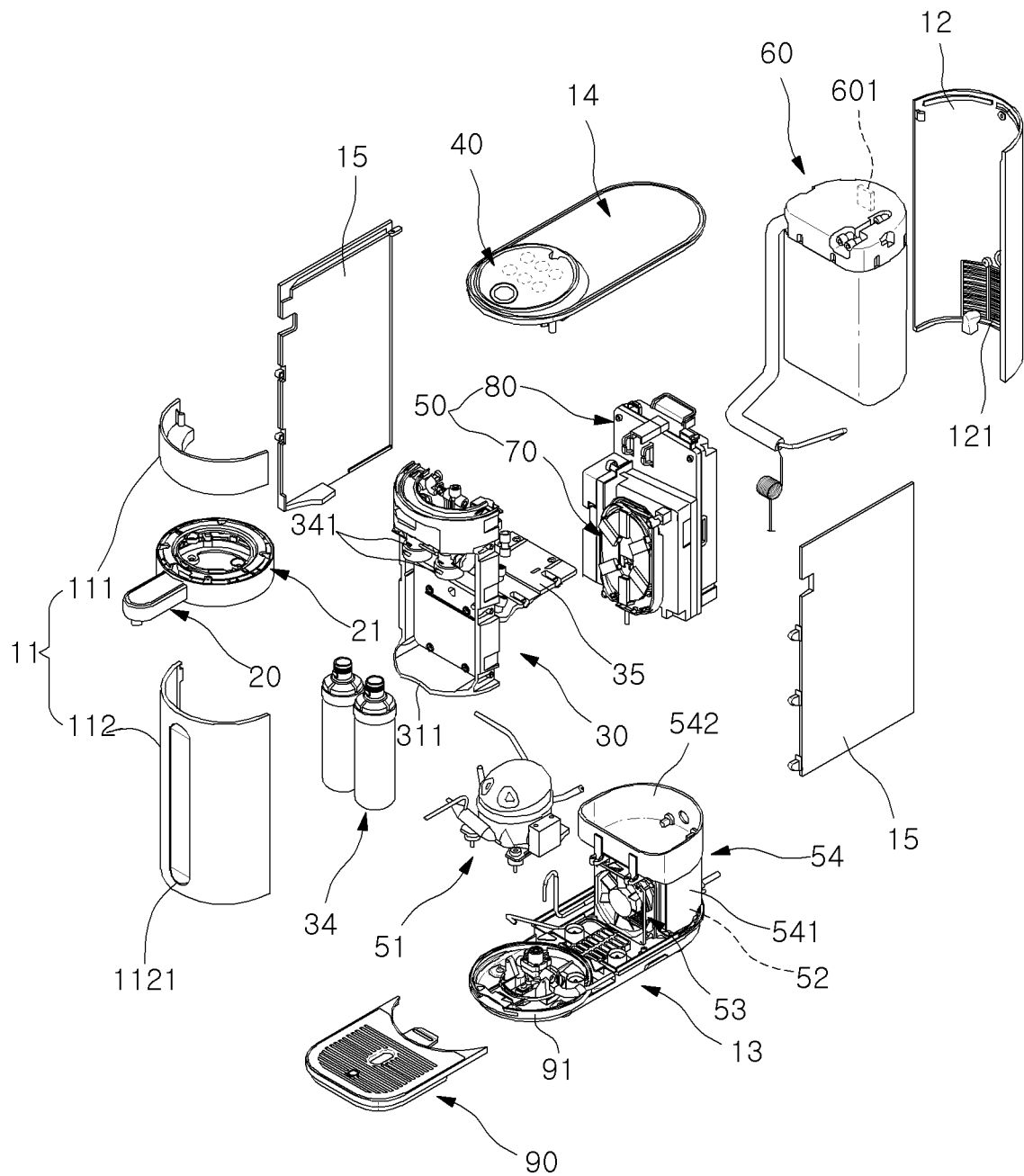

[Fig. 3]
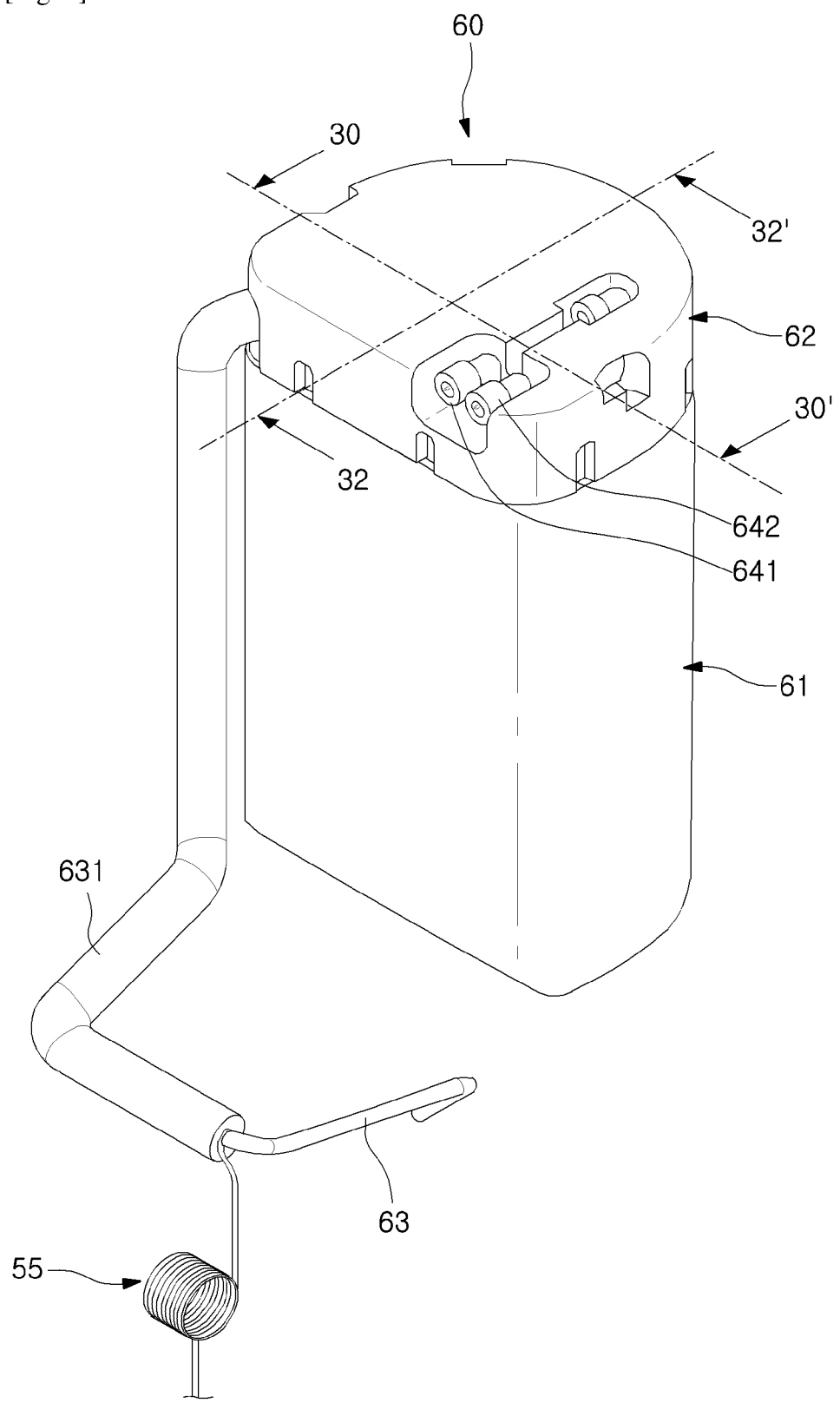

[Fig. 4]
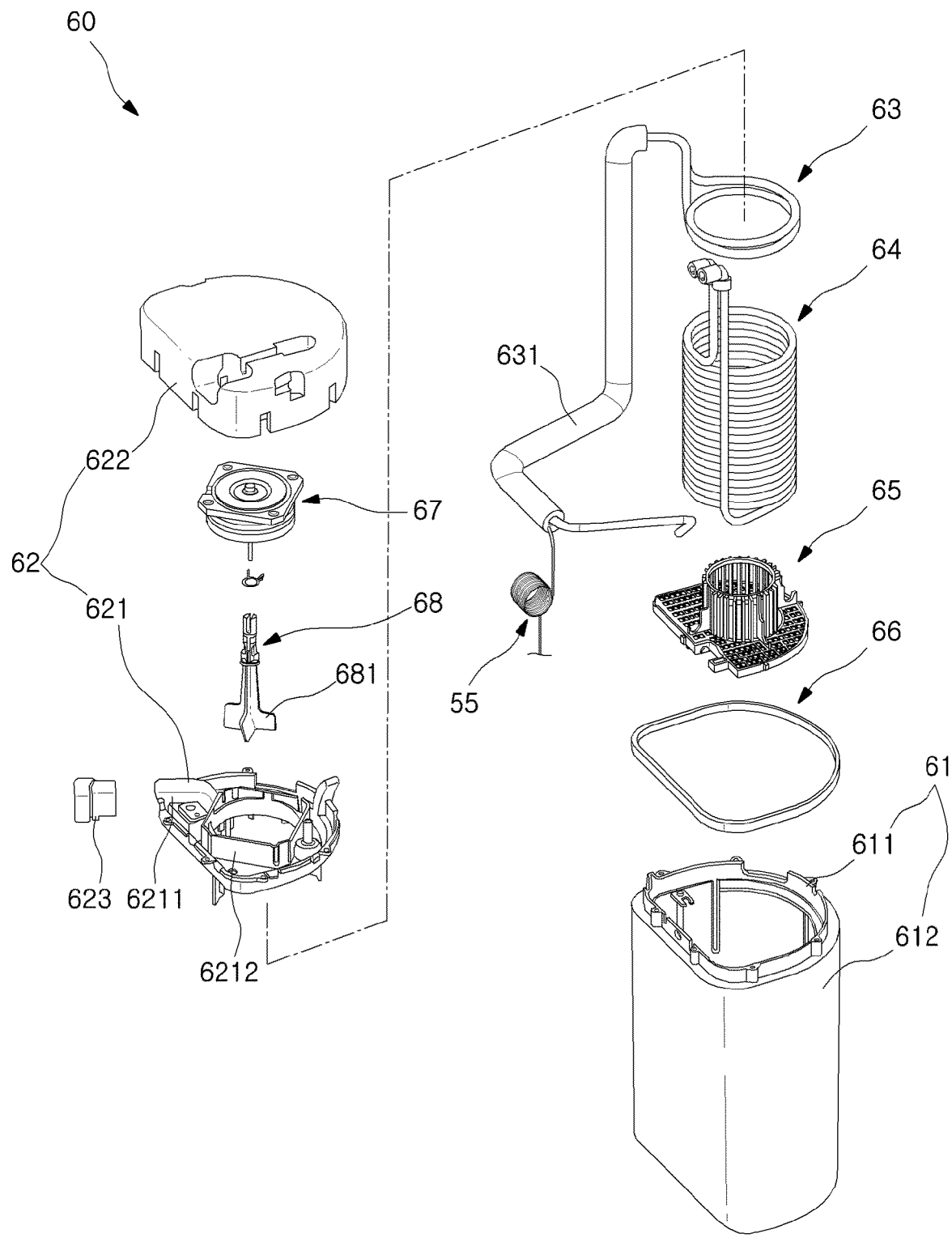

[Fig. 5]
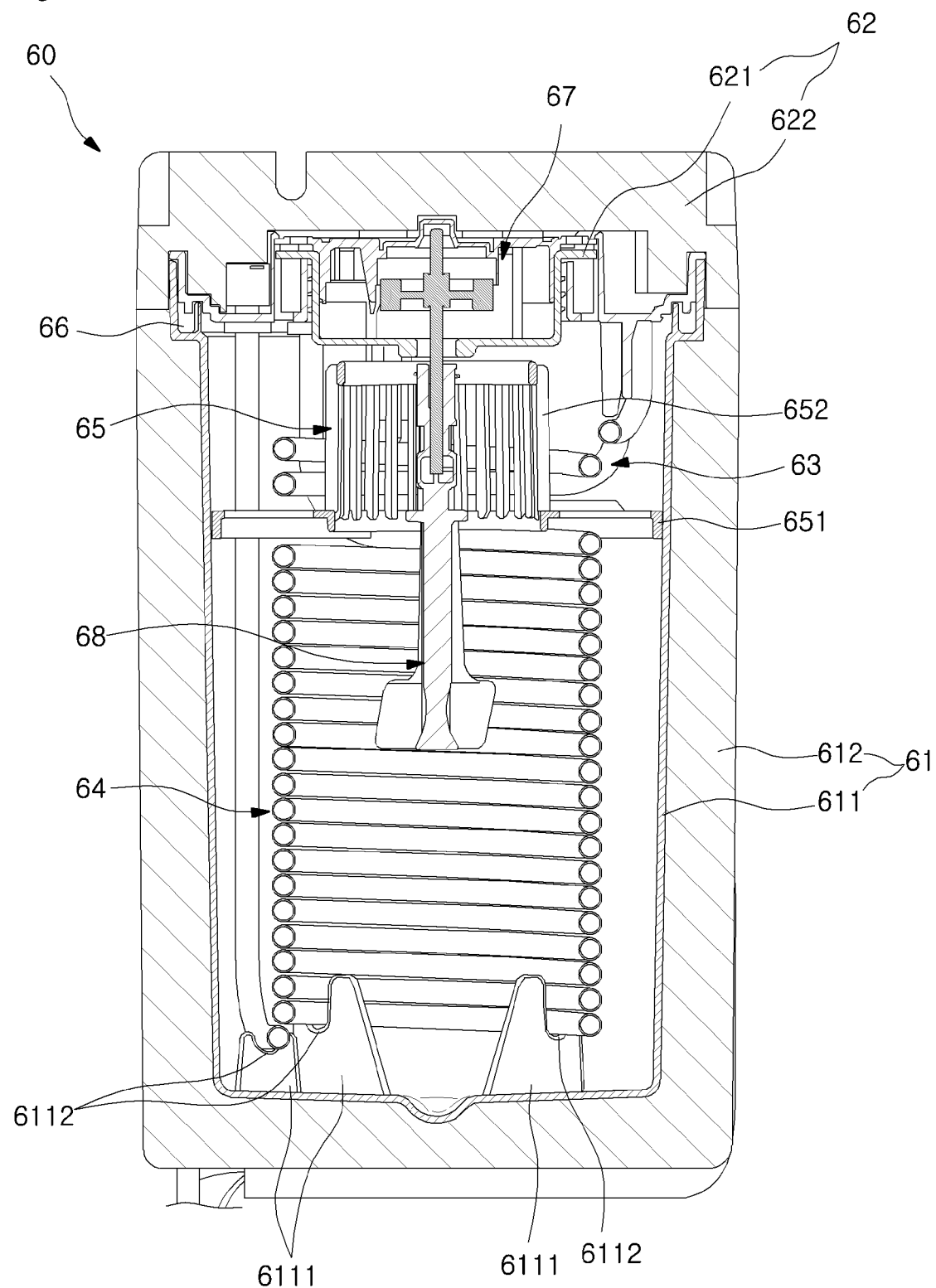

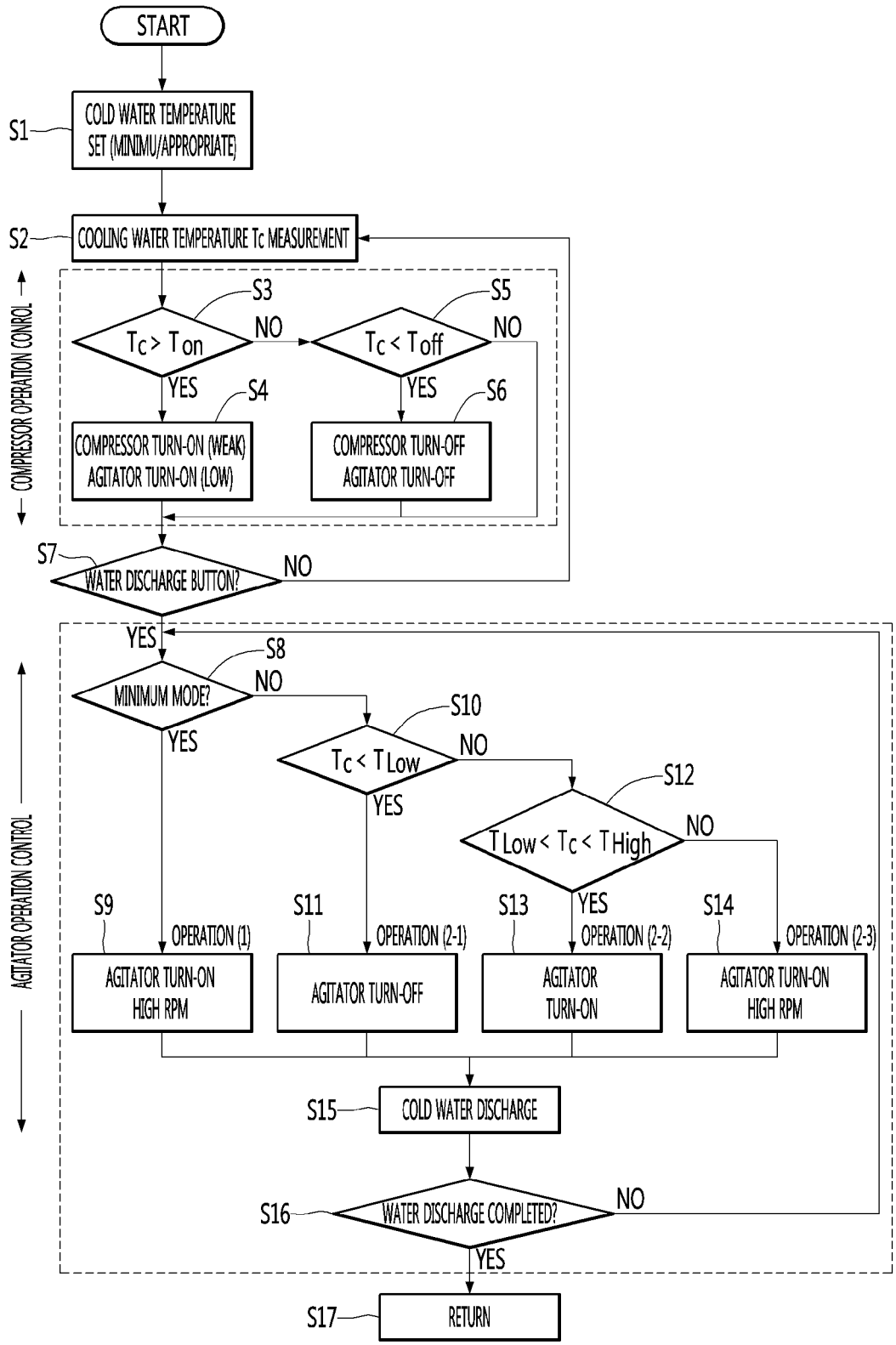
[Fig. 6]

[Fig. 7]
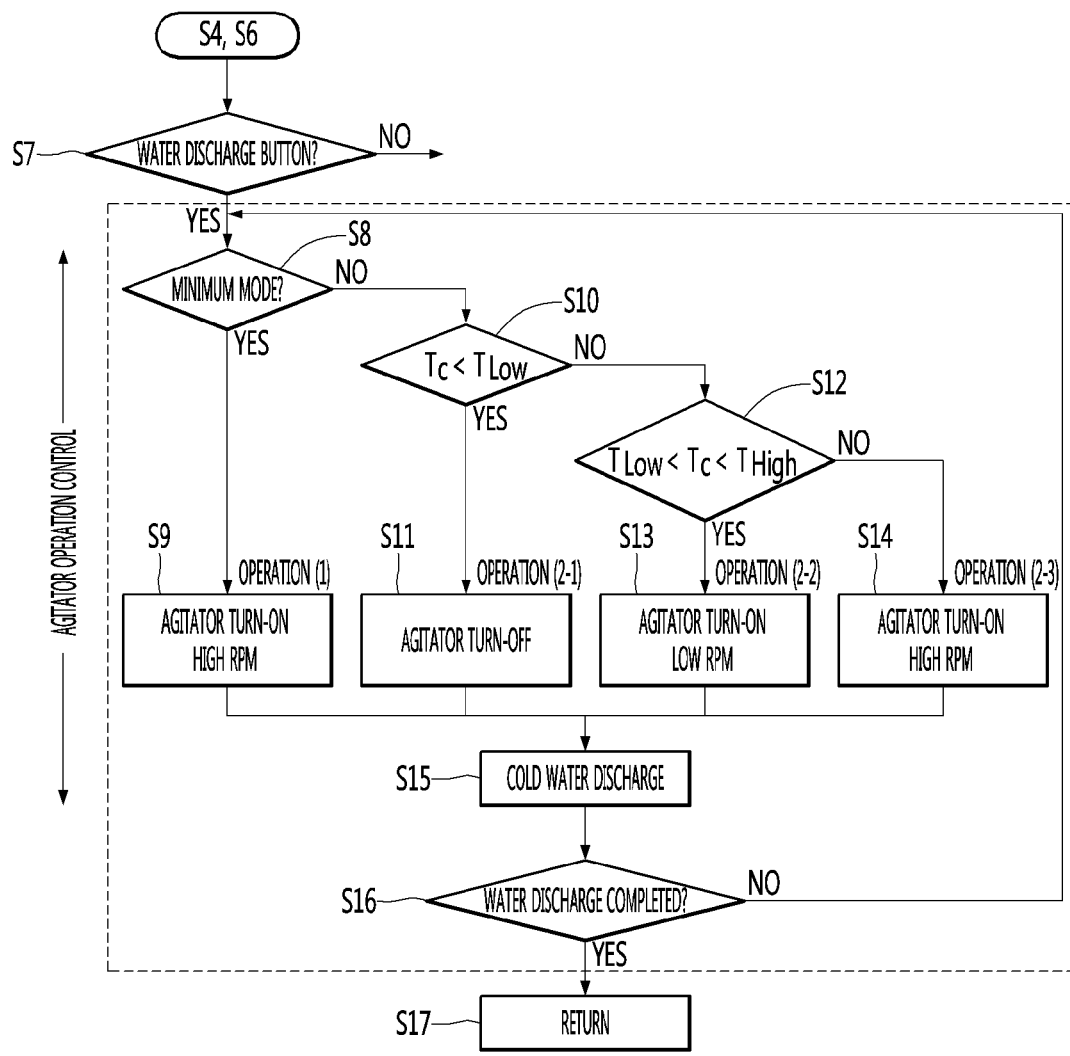

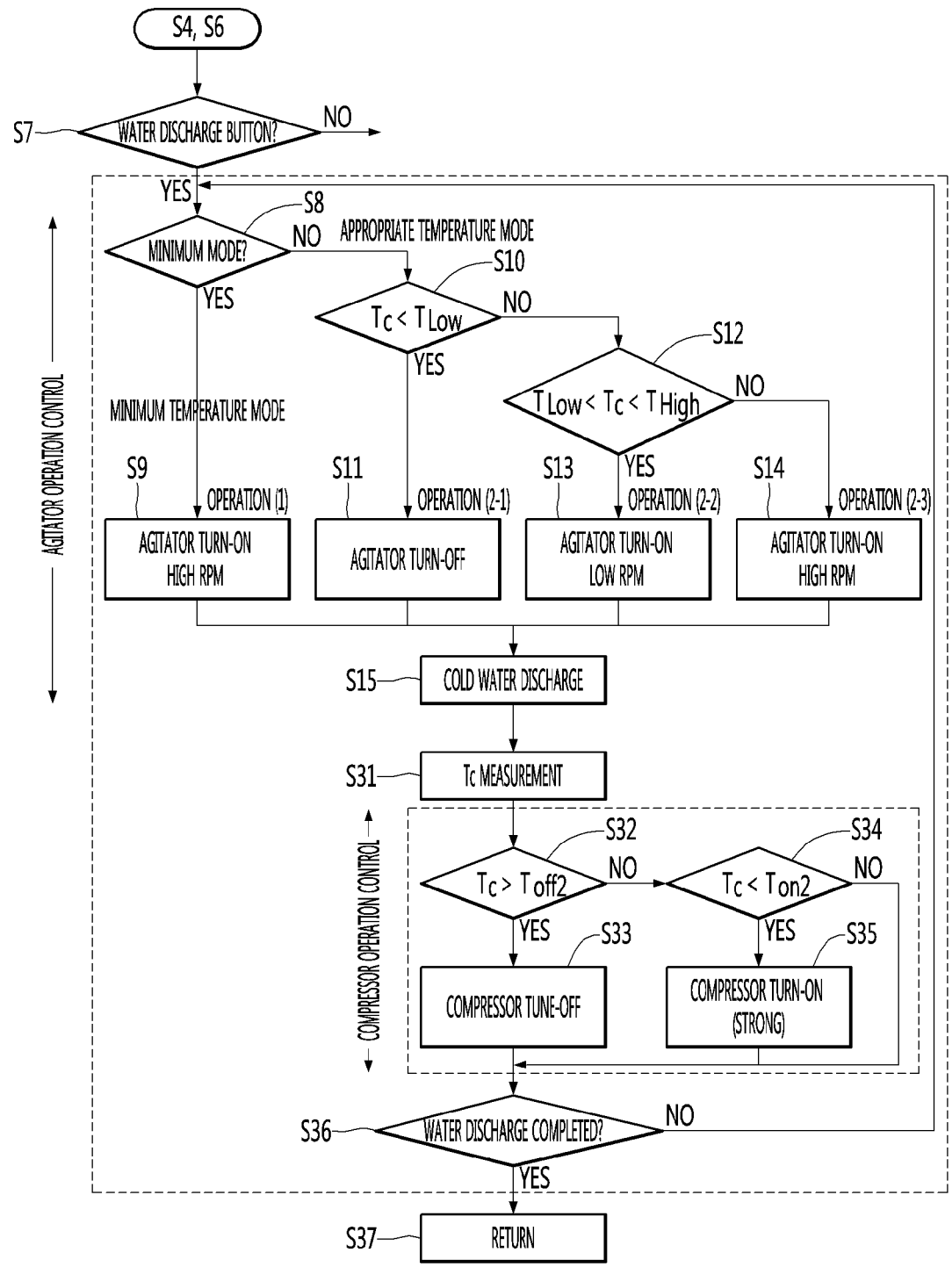
[Fig. 8]

[Fig. 9]
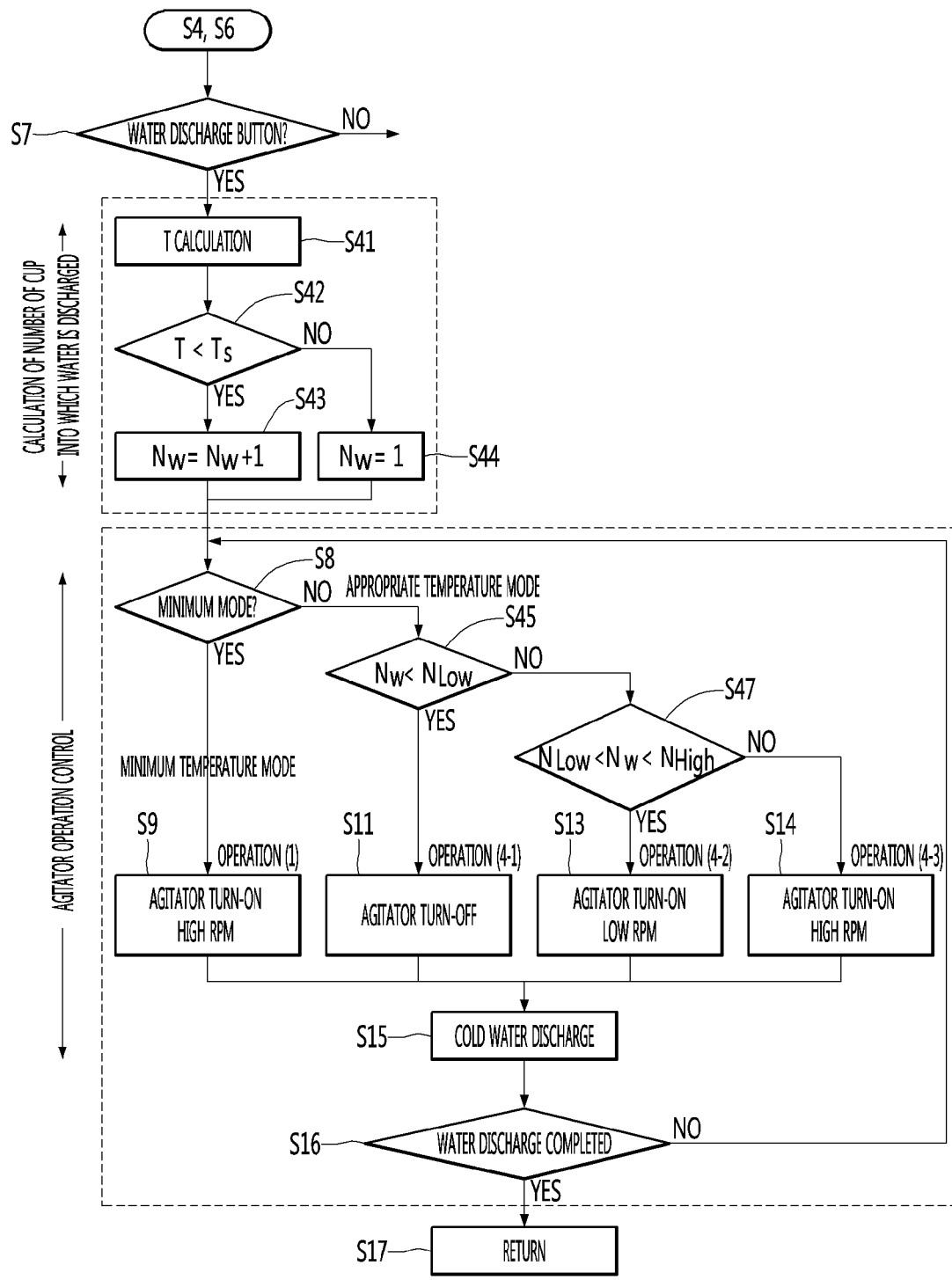

[Fig. 10]
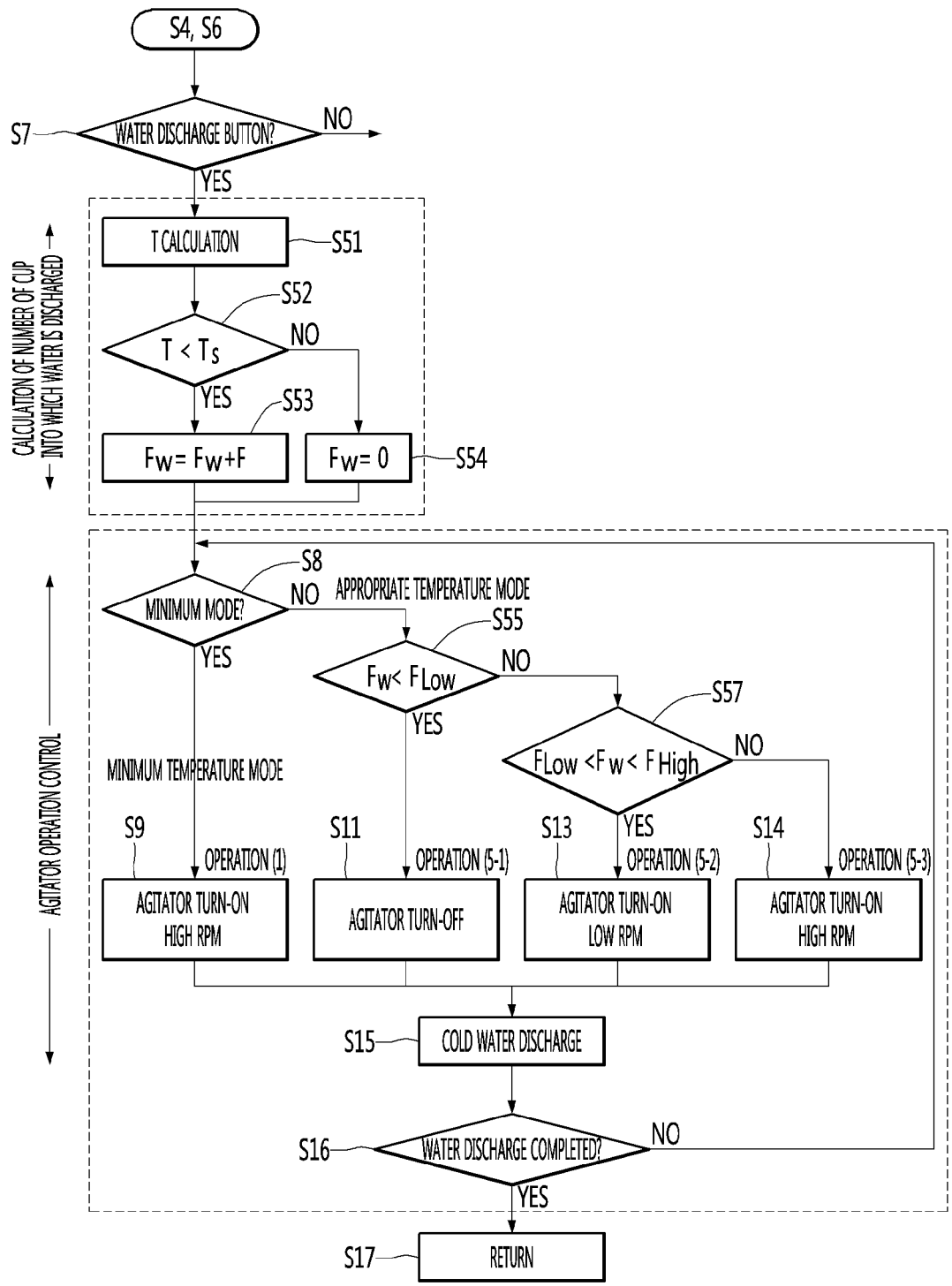

[Fig. 11]
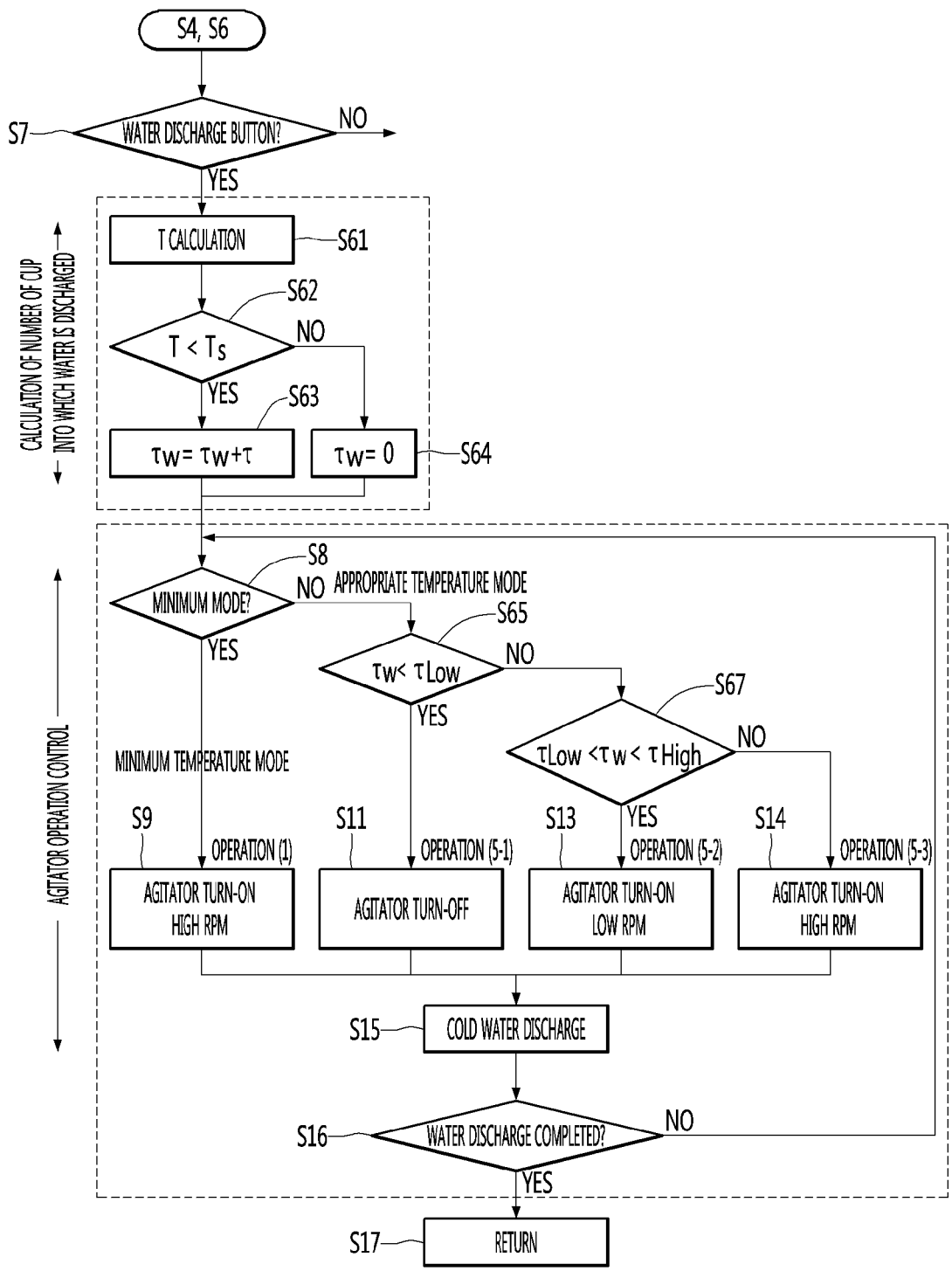

[Fig. 12]
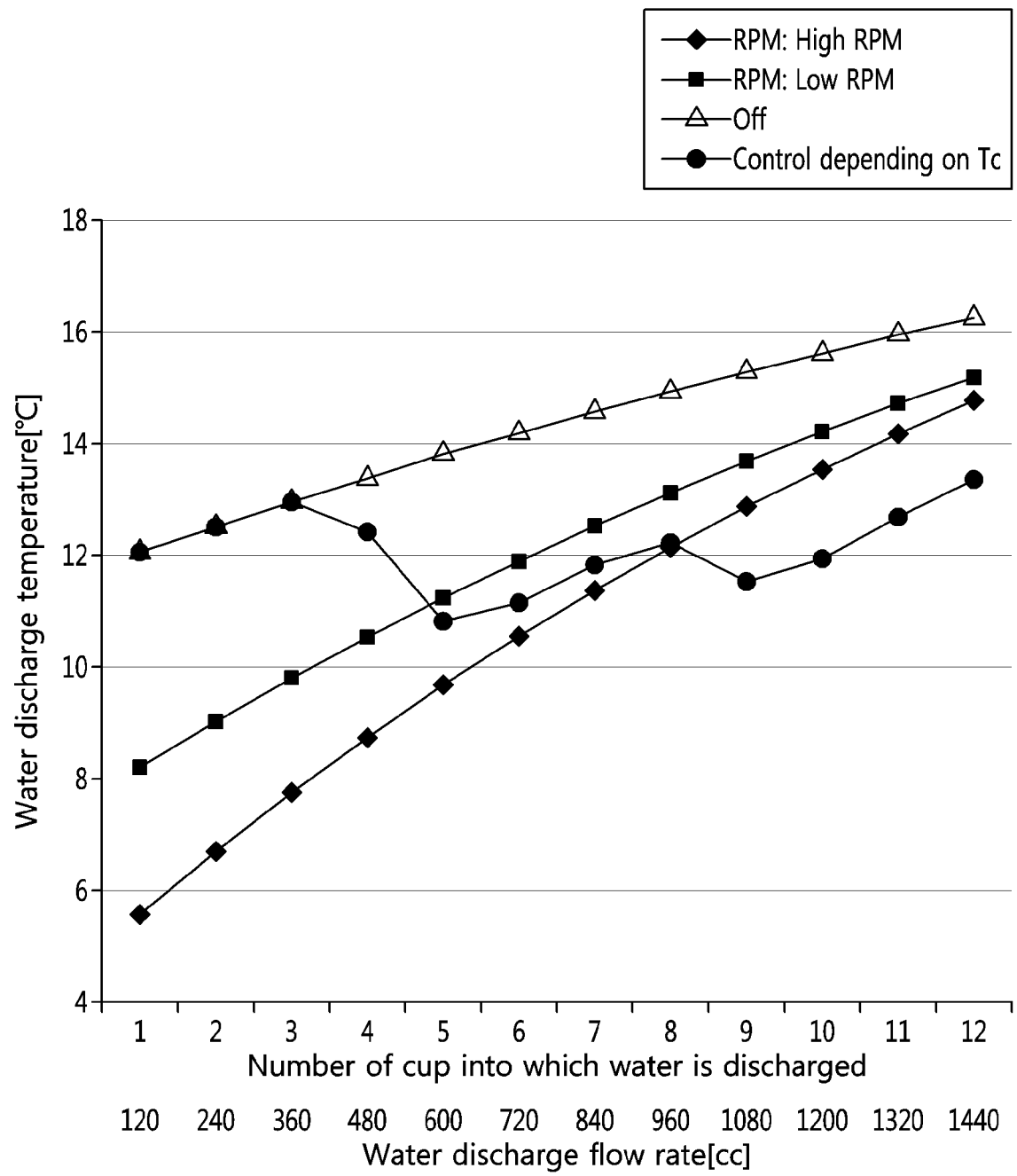

WATER PURIFIER AND METHOD FOR CONTROLLING THE SAME

CROSS REFERENCE TO RELATED PATENT APPLICATIONS

This application is a U.S. National Stage Application under 35 U.S.C. § 371 of PCT Application No. PCT/KR2019/003524, filed Mar. 26, 2019, which claims priority to Korean Patent Application No. 10-2018-0039908, filed Apr. 5, 2018, whose entire disclosures are hereby incorporated by reference.

TECHNICAL FIELD

The present disclosure relates to a water purifier and a method for controlling the same.

BACKGROUND ART

In general, water purifiers are being used for household purposes as mechanisms that filter water to remove impurities.

In the case of household water purifiers, the water purifiers are connected to a water supply system to remove floating matter or harmful components, which are contained in tap water, and to purify as much water as desired by a user's manipulation to dispense the purified water.

As described above, household water purifiers are being released in various products, which are capable of dispensing hot water and cold water as well as purified water. Also, in recent years, water purifiers capable of being installed in various installation environments with small sizes are being developed.

A water purifier including a cooling tank accommodating cooling water, an evaporator provided in the cooling tank, and a cooling coil through which purified water passes and which is cooled by the cooling water is disclosed in Korean Patent Publication No. 10-2017-0063452. The cooling water receives cold air from the evaporator and supplies the cold air to the cooling coil. As a result, the water purifier further includes a motor and an agitator turning on and/or off to agitate the cooling water by using the motor.

However, the water purifier according to the related art may have the following limitations.

First, when the water is continuously discharged from the water purifier, the discharged water may gradually increase in temperature so that a consumer obtains cold water after the continuous water discharge process. An optimum temperature which is satisfied as a temperature of the cold water by the consumer is in the range of about 12 degrees to about 14 degrees. However, when the water is continuously discharged, the temperature of the discharged water may exceed the optimum temperature.

Second, when the temperature of the cooling water decreases to cope with the continuous water discharge, an initial temperature of the discharged water is excessively low, and a lot of energy is consumed for excessive driving of a refrigeration system.

Third, if a personal variation with respect to the optimum temperature is not considered as cold water, the consumer receives only cold water having a predetermined temperature.

PRIOR ART DOCUMENT

Patent Document

Korean Patent Publication No. 10-2017-0063452

DISCLOSURE

Technical Problem

Embodiments provide a water purifier or a liquid dispenser that is capable of reducing a deviation between an initially discharged water temperature and a finally discharged water temperature and a method for controlling the water purifier.

Embodiments also provide a method for controlling a water purifier, in which cooling water within the water purifier is maintained at an appropriate temperature to reduce excessive energy consumption.

Embodiments also provide a water purifier that is capable of supplying cold water at a temperature desired by a consumer, and a method for controlling the water purifier.

Technical Solution

In one embodiment, a water purifier includes: a cooling coil through which purified water flows; a cooling water accommodated in a cooling tank; an agitator configured to agitate the cooling water and heat-exchange the cooling water with the cooling coil; and a motor coupled to the agitator to allow the agitator to rotate, the agitator operating at at least two rotational speeds other than zero. The agitator may be optimally controlled to optimally control a temperature of the purified water to be drunk.

A selection button to select an operation of the water purifier may include a mode selection button configured to select one of a minimum temperature mode in which cold water is cooled as much as possible and a cold water temperature mode in which an optimum cold water temperature is provided. In the minimum temperature mode, water having a temperature as low as possible may be discharged by accepting user's preference, and in the cold water temperature mode, water having a temperature that is generally satisfied by a user may be provided. Thus, the water purifier that is more satisfactory according to user's preference may be provided.

The motor may operate in a normal state at a constant speed at at least the two rotational speeds other than zero so that the motor operates to be optimized in the operation mode.

In another embodiment, a method for manufacturing a water purifier includes: allowing a water discharge button to operate; performing a first mode in which the agitator is stopped when temperature-related information of the cooling water is less than a first critical value, a second mode in which the agitator rotates at a first rotational speed that is a low speed when the temperature-related information of the cooling water is greater than the first critical value, but less than a second critical value that is greater than the first critical value, and a third mode in which the agitator rotates at a second rotational speed that is quicker than the first rotational speed when the temperature-related information is greater than the second critical value, on the basis of the temperature-related information of the cooling water, and discharging or dispensing the purified water.

Thus, the agitator may be controlled based on an amount of discharged purified water to control the heat-exchange between the cooling water and the purified water so that the purified water is quickly provided at a temperature that is desired by the user. In addition, the chilled cold air may be supplied so that the desired temperature of the purified water is quickly realized, instead of a fact that a low temperature is not quickly realized through a general refrigeration cycle.

A manipulation part including at least one selection button provided in the water purifier to receive a user's manipulation signal may be further provided, and the selection button may include a mode selection button configured to select one of a minimum temperature mode in which cold water is cooled as much as possible and a cold water temperature mode in which an optimum cold water temperature is provided. In the minimum temperature mode, water having a temperature as low as possible may be discharged by accepting user's preference, and in the cold water temperature mode, water having a temperature that is generally satisfied by a user may be provided. Thus, the water purifier that is more satisfactory according to user's preference may be provided.

When the mode selection button is selected in the minimum temperature mode, the agitator may rotate at a speed that is quicker than the first rotational speed regardless of the temperature-related information of the cooling water. Thus, the heat-exchange between the cooling water and the purified water may increase to quickly realize the temperature that is desired by the user.

The method may further include, before the water discharge button operates, measuring a temperature of the cooling water; and allowing a compressor to operate at a low frequency and allowing the agitator to rotate at a speed less than the second rotational speed when the temperature of the cooling water is greater than a first reference temperature of the compressor or a first reference temperature used to control the compressor, which is a predetermined temperature, on the basis of the temperature of the cooling water. Thus, since the refrigeration cycle that takes time is previously driven, the user may quickly receive the purified water having the desired temperature.

The method may further include turning off the compressor and the agitator when the temperature of the cooling water is less than a second reference temperature of the compressor or a second reference temperature used to control the compressor, which is less than the first reference temperature of or for the compressor. Thus, unnecessary energy consumption may be prevented.

The compressor may be stopped in the first mode, and the compressor may operate in the second mode and the third mode to better improve energy consumption efficiency.

The method may further include: measuring the temperature of the cooling water after the discharge of the cooling water starts; and maintaining or converting the operations of the compressor and the agitator on the basis of the measured temperature of the cooling water. Thus, operation states of the compressor and the agitator as the current state may be synchronized with an operation state of the water purifier, and thus, the water purifier may operate with high efficiency to expect high satisfaction of the consumer.

The method may further include: turning off the compressor when the temperature of the cooling water is less than a fourth reference temperature of the compressor, which is a predetermined temperature; allowing the compressor and the agitator to operate when the temperature of the cooling water is greater than a third reference temperature of or for the compressor, which is greater than the fourth reference temperature of or for the compressor; and maintaining the current operation states of the compressor and the agitator when the temperature of the cooling water is between the fourth reference temperature of or for the compressor and the third reference temperature of or for the compressor. Thus, it may be possible to quickly respond if the temperature is changed while the water is discharged.

The selected operation of the compressor and the selected operation of the agitator may be performed until the water is completely discharged. Thus, even though a large amount of water is discharged, the purified water having the temperature desired by the user may be supplied.

The temperature-related information of the cooling water may be a temperature of the cooling water, which is related to the operation of the agitator and measured by a temperature sensor, the first critical value may be a first set temperature of the agitator or a first set temperature used to control the agitator, and the second critical value may be a second set temperature of the agitator or a second set temperature used to control the agitator. Thus, the agitator may operate based on the information of the temperature sensor to predict an amount of water that is already discharged, thereby determining the heat-exchange between the cooling water and the purified water so that the purified water satisfied by the user is provided.

The temperature-related information of the cooling water may be the number of cups into which water is continuously discharged within a predetermined time interval, the first critical value may be the first set water discharge number of times of the water discharge, and the second critical value may be the second set water discharge number of times of the water discharge. Thus, an amount of water that is already discharged may be predicted as the number of cups into which water is discharged to determine the heat-exchange between the cooling water and the purified water so that the purified water satisfied by the user is provided.

The temperature-related information of the cooling water may be a flow rate of water that is continuously discharged within a predetermined time interval, the first critical value may be a first set water discharge flow rate, and the second critical value may be a second set water discharge flow rate. Thus, an amount of water that is already discharged may be predicted as a water discharge flow rate to determine the heat-exchange between the cooling water and the purified water so that the purified water satisfied by the user is provided.

The temperature-related information of the cooling water may be a water discharge time of water when the water is continuously discharged within a predetermined time interval, the first critical value is a first set time of the water discharge, and the second critical value may be a second set time of the water discharge. Thus, an amount of water that is already discharged may be predicted as a water discharge time to determine the heat-exchange between the cooling water and the purified water so that the purified water satisfied by the user is provided.

In further another embodiment, a method for controlling a water purifier, which increases purified water, cooling water accommodated in a cooling tank to cool the purified water, an agitator configured to adjust heat-exchange between the purified water and the cooling water, a motor coupled to the agitator to allow the agitator to rotate, and a water discharge button configured to instruct water discharge, the method includes, before the water discharge button operates, measuring a temperature of the cooling water; allowing a compressor to operate at a low frequency and allowing the agitator to rotate at a low speed when the temperature of the cooling water is greater than a first reference temperature of or for the compressor, which is a predetermined temperature, on the basis of the temperature of the cooling water; and turning off the compressor and the agitator when the temperature of the cooling water is less than a second reference temperature of or for the compressor, which is less than the first reference temperature of or for the compressor, on the basis of the temperature of the cooling water. According to an embodiment, a water discharge preparation may be optimally performed according to the current state of the water purifier.

The method may further include, after the water discharge button operates: performing a first mode in which the agitator is stopped when temperature-related information of the cooling water is less than a first critical value, a second mode in which the agitator rotates at a first rotational speed that is a low speed when the temperature-related information of the cooling water is greater than the first critical value, but less than a second critical value that is greater than the first critical value, and a third mode in which the agitator rotates at a second rotational speed that is quicker than the first rotational speed when the temperature-related information is greater than the second critical value, on the basis of the temperature-related information of the cooling water, and discharging the purified water. Thus, the water purifier may provide purified water having an optimum temperature while discharging the purified water.

The temperature-related information may include at least one of: a temperature of the cooling water, which is related to the operation of the agitator and measured by a temperature sensor; the number of cups into which water is continuously discharged within a predetermined time interval; a flow rate of water that is continuously discharged within a predetermined time interval; or a water discharge time of water when the water is continuously discharged within a predetermined time interval. Thus, the water purifier may operate based on the information with respect to the amount of water that is already discharged to more precisely realize the temperature of the purified water, which is desired by the user.

The compressor may be stopped in the first mode, and the compressor may operate in the second mode and the third mode. Thus, the energy may be saved.

Advantageous Effects

According to the embodiment, the heat-exchange between the cooling water and the purified water may be efficiently performed by using the agitator to maintain the temperature within the predetermined range regardless of the amount of discharged cold water.

According to the embodiment, the temperature of the cooling water may be optimally maintained to optimize the operation of the compressor, thereby reducing the power consumption of the water purifier.

According to an embodiment, the modes with respect to the temperature of the cold water to provide the temperature of the cold water according to the temperature desired by the consumer, thereby largely satisfying the consumer.

DESCRIPTION OF DRAWINGS

FIG. 1 is a perspective view of a water purifier according to an embodiment.
FIG. 2 is an exploded perspective view of the water purifier.
FIG. 3 is a perspective view illustrating a cooling tank of the water purifier.
FIG. 4 is an exploded perspective view of the cooling tank.
FIG. 5 is a cross-sectional view taken along line 30-30" of FIG. 3.
FIG. 6 is a flowchart for explaining a method for controlling a water purifier.
FIG. 7 is a flowchart for explaining a method for controlling a water purifier in which a compressor is controlled together when an operation of an agitator is controlled.
FIG. 8 is a flowchart for explaining a method for controlling a water purifier in which a compressor is controlled after an operation of an agitator is controlled.
FIG. 9 is a flowchart for explaining a method for controlling a water purifier according to the number of cups into which water is discharged.
FIG. 10 is a flowchart for explaining a method for controlling a water purifier according to an accumulated water discharge flow rate.
FIG. 11 is a flowchart for explaining a method for controlling a water purifier according to a water discharge accumulation time.
FIG. 12 is a graph illustrating results obtained by performing a simulation in which the method for controlling the water purifier is applied according to an embodiment.

MODE FOR INVENTION

Hereinafter, exemplary embodiments will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

FIG. 1 is a perspective view of a water purifier or a liquid dispenser according to an embodiment. FIG. 2 is an exploded perspective view of the water purifier.

As illustrated in the drawings, a water purifier or a liquid dispenser 1 according to an embodiment has a length that is long in a front and rear direction, and thus the water purifier 1 has a narrow width in a left and right direction. Thus, the water purifier 1 has a slim and compact outer appearance as a whole.

The outer appearance or exterior of the water purifier 1 may be defined by a case 10. The case 10 includes a front cover 11 defining an outer appearance of a front surface, a rear cover or cooling fan cover 12 defining an outer appearance of a rear surface, a base 13 defining a bottom surface, a top cover 14 defining a top surface, and side panels 15, defining both left and right surfaces. The front cover 11, the rear cover 12, the base 13, the top cover 14, and the pair of side panels 15 may be assembled with each other to define the outer appearance or exterior of the water purifier 1.

A water discharge part or dispenser 20 may be provided on a front surface of the water purifier 1 and protrude forward from the front cover 11 to discharge the purified water through a water discharge nozzle 25 that protrudes downward.

The front cover 11 may be constituted by an upper cover 111 and a lower cover 112. A rotator 21 may be rotatably disposed between the upper cover 111 and the lower cover 112.

The water discharge part 20 rotates together with the rotator 21. Thus, a user may allow the water discharge part 20 to rotate at a desired angle according to an installation state or installation environment of the water purifier 1. Here, a manipulation part or user interface 40 disposed on the top cover 14 may rotate together with the top cover 14 and/or the upper cover 111.

A plurality of selection buttons to allow the user to manipulate the water purifier 1 may be provided on the manipulation part 40. One of the selection buttons may allow selection of a minimum temperature mode and/or an appropriate or general temperature mode. The minimum temperature mode may be a mode in which water having a temperature as low as possible is supplied when cold water is supplied, and the appropriate temperature mode may be a mode in which cold water having an appropriate temperature, i.e., an optimal cold water temperature of about 12 degrees to about 14 degrees, is supplied when cold water is supplied. The manipulation part 40 may also include a water discharge or dispensing button 41.

In the base 13, a tray or drip collector 90 may protrude forward from the front cover 11 and be disposed directly below the water discharge part 20. The tray 90 may rotate by the user's manipulation and be separated from the base 13. The tray 90 may have a top surface that has a grill shape so that water dropping from the water discharge part 20 is stored in the top surface of the tray 90.

A filter bracket or frame 30 on which a filter 34 to purify or filter water and a plurality of valves 366, 367, and 369 are mounted is provided in the case 10, and the rotator 21 is rotatably mounted on an upper end of the filter bracket 30. The manipulation part 40 may be provided above the rotator 21. The manipulation part 40 may be connected to the rotator 21 to rotate together with the rotator 21 when the rotator 21 rotates.

A rotation ring 91 that is rotatably mounted is disposed on the base 13, and the tray 90 is detachably disposed on the rotation ring 91. Thus, the tray 90 may be rotatable in the state of being mounted and be disposed at a lower side corresponding to or below the water discharge part 20. As necessary, the tray 90 may be coupled to and separated from the rotation ring 91.

A compressor 51 and a condenser 52 are provided on the top surface of the base 13. A cooling fan 53 is disposed between the compressor 51 and the condenser 52 to cool the compressor 51 and the condenser 52. An inverter-type compressor capable of adjusting cooling capacity by varying a frequency may be used as the compressor 51. Thus, the purified water may be efficiently cooled to reduce power consumption.

The condenser 52 may be disposed at a rear side of the base 13 and also disposed at a position corresponding to a discharge hole 121 defined in the rear cover 12. The condenser 52 may have a structure in which a flat tube-type refrigerant tube is bent several times to efficiently use a space and improve heat-exchange efficiency and be accommodated in a condenser bracket 54.

A condenser mounting part or frame 541 to which the condenser 52 is fixed and a tank mounting part or frame 542 on which a cooling tank 60 to make cold water is mounted may be provided in the condenser bracket 54. The condenser mounting part 541 provides a space having a hexahedral shape corresponding to the whole shape or outer contour of the condenser 52 to accommodate the condenser 52. The condenser mounting part 541 has portions that are opened and face the cooling fan 53 and the discharge hole 121 to effectively cool the condenser 52.

The tank mounting part 542 is disposed on the condenser bracket 54, i.e., above the condenser mounting part 541. A lower end of the cooling tank 60 is inserted into the tank mounting part 542 to fix the cooling tank 60.

The cooling tank 60 cools purified water to make cold water, and cooling water that is heat-exchanged with the introduced purified water is filled into the cooling tank 60. An evaporator 63 (FIG. 3) to cool the cooling water may be accommodated in the cooling tank 60. The purified water may be cooled by passing through the inside of the cooling tank 60.

An agitator 68 (see FIG. 4) is provided in the cooling tank 60 to agitate the cooling water. The cooling water may be agitated to improve heat-exchange efficiency between the evaporator 63 and a cooling coil 64 (FIG. 4), i.e., heat-exchange efficiency due to convection cooling. In detail, cold air of the evaporator 63 may be more smoothly or easily supplied, and also, cold air of the cooling water may be more smoothly or easily supplied into the cooling coil.

A support plate 35 extending to the cooling tank 60 may be further provided at one side of the filter bracket 30. The support plate 35 may be disposed above the compressor 51 and extend from the filter bracket 30 up to the condenser bracket 54 to provide a space in which a heating and control module 50 is mounted.

A heating and control module or assembly 50 may include an induction heating assembly or heater 70 to make hot water and a control assembly or controller 80 to control an operation of the water purifier 1. The induction heating assembly 70 and the control assembly 80 may be coupled to each other to form one module and then be mounted on the support plate 35.

The induction heating assembly 70 may heat the purified water in an induction heating manner. The induction heating assembly 70 may immediately and quickly heat water when dispensing of hot water is manipulated and also may control an output of magnetic fields to heat the purified water at a desired temperature and thereby to provide the hot water to the user. Thus, hot water having a desired temperature may be dispensed according to the user's manipulation.

The control assembly 80 may control an operation of the water purifier 1. That is, the control assembly 80 may control the compressor 51, the cooling fan 53, various motor, valves, and sensors, and the induction heating assembly 70. The control assembly 80 may be provided as a module by combination of printed circuit boards (PCBs) that are divided into a plurality of parts for each function. In a structure that dispenses only cold water and purified water from the water purifier 1, a PCB to control the induction heating assembly 70 may be omitted, and also, at least one or more PCBs may be omitted in the above-described manner. A memory in which various pieces of information required to control the water purifier is at least provided in the control assembly 80.

FIG. 3 is a perspective view illustrating the cooling tank of the water purifier, FIG. 4 is an exploded perspective view of the cooling tank, and FIG. 5 is a cross-sectional view taken along line 30-30' of FIG. 3.

Referring to FIGS. 2 to 5, the cooling tank 60 is provided at a rear side of the heating and control module 50, and a lower end of the condenser bracket 54 is inserted into and mounted on the cooling tank 60. The cooling tank 60 may have an entire outer appearance or exterior defined by a tank body or container 61 and a tank cover or lid 62 covering an opened top surface of the tank body 61.

The tank body 61 includes an inner case 611 defining a space into which the cooling water is filled and a heat insulation material body or outer cover 612 disposed outside the inner case 611. The inner case 611 may be injectionmolded by using a resin material, and the heat insulation material body 612 may be formed by foaming a foaming solution to the outside of the inner case 611.

The tank cover 62 may be disposed above the opening of the tank body 61 to cover the opening. The tank cover 62 may include an inner cover or frame 621 formed through injection molding and a heat insulation material cover or outer cover 622 surrounding the outside of the inner cover 621.

The tank body 61 and the tank cover 62 may have an outer appearance or exterior defined by heat insulation materials 612 and 622, respectively. The evaporator 63 may pass through the tank cover 62 and then be introduced. A tube of the evaporator 63 connected to the outside of the tank cover 62 is surrounded by a heat insulation material such as polyethylene (PE) foam 631 and thus be thermally insulated. Here, a portion of a capillary used as an expansion device may be surrounded together with the tube of the evaporator 63 and then be fixed.

A cold water temperature sensor 601 may be provided in the cooling tank 60. A temperature Tc of the cooling water, which is measured by the cold water temperature sensor 601, may be key to determining an operation of a refrigeration cycle.

For example, when the temperature of the cooling water, which is measured by the cold water temperature sensor 601, is higher than a first reference or predetermined temperature Ton used to control the compressor 51, the refrigeration cycle of the water purifier 1 operates to reduce the temperature of the cooling water. The cooling water stored in the inner case 611 is cooled by a refrigerant passing through the evaporator 63.

When the temperature Tc of the cooling water, which is measured by the cold water temperature sensor 601, is less than a second reference or predetermined temperature Toff used to control the compressor 51, the operation of the refrigeration cycle of the water purifier 1 is stopped. The second reference temperature Toff for the compressor 51 is less than the first reference temperature Ton. The first reference temperature Ton for the compressor 51 and the second reference temperature Toff for the compressor 51 may serve as references for the operation and stop of the refrigeration cycle, respectively. Thus, the cooling water stored in the inner case 611 may be maintained at a temperature between the first reference temperature Ton for the compressor 51 and the second reference temperature Toff for the compressor 51 by the temperature measurement of the cold water temperature sensor 601 and the operation of the refrigeration cycle.

The cooling coil 64 is accommodated in an inner space of the inner case 611. The cooling coil 64 may be a passage through which purified water is cooled by passing so as to become cold water. The cooling coil 64 is installed in the inner case 611 and is in a state of being sunken in the cooling water. The purified water passing through the cooling coil 64 is heat-exchanged with the cooling water. Thus, heat of the purified water within the cooling coil 64 may be transferred to the cooling water, and then, the purified water becomes cold water within a short time due to the heat-exchange with the cooling water. The cooling coil 64 may be made of a metal material such as stainless steel to accelerate the heat exchange. An inlet 641 and an outlet 642 of the cooling coil 64 pass through the tank cover 62 and may be exposed to the outside of the cooling tank 60.

A coil support part or support 6111 supporting the cooling coil 64 is disposed on a bottom surface of the inner case 611. The coil support part 6111 protrudes from the bottom surface of the inside of the inner case 611 toward the cooling coil 64. The coil support part 6111 has a groove 6112 having a size corresponding to an outer circumferential surface of the cooling coil 64. The cooling coil 64 is mounted on the groove 6112 of the coil support part 6111 and supported by the coil support part 6111.

The cooling coil 64 may be spaced apart from the bottom surface of the inner case 611. The cooling water may flow through a space between a lower end of the cooling coil 64 and the bottom surface of the inner case 611. Thus, the cooling water may be smoothly circulated to improve cooling efficiency of the purified water within the cooling coil 64.

A mesh member or frame 65 may be provided in the inner case 611. The mesh member 65 may be disposed between the evaporator 63 and the cooling coil 64. The evaporator 63 may be introduced into the inner case 611 and then wound in a shape such as a coil. The evaporator 63 may be disposed above the cooling coil 64. The mesh member 65 may be disposed between the evaporator 63 and the cooling coil 64 to support the evaporator 63 and also be seated on an upper end of the cooling coil 64. The mesh member 65 may have a base 651 configured to fit within the inner case 611 and/or on top of the cooling coil 64.

A gasket 66 to seal a gap between the tank body 61 and the tank cover 62 may be provided on an upper end of the inner case 611.

A plug mounting part or base 6211 on which a plug 623 is mounted and a motor mounting part or space 6212 on which a motor 67 to drive the agitator 68 is mounted may be disposed on the inner cover 621 defining the bottom surface of the tank cover 62.

The plug 623 may be a portion through which a tube and a wire of the evaporator 63 enter. The plug 623 may prevent the tube of the evaporator 63 from directly contacting the inner cover 621 and maintain sealing. The plug 623 may be made of a soft material such as rubber or silicon to prevent the bent tube or wire of the evaporator 63 from being damaged while entering into the tank cover 62.

The motor 67 is mounted on the motor mounting part 6212 that is opened at a center of the inner cover 621. The motor 67 may be disposed so that a rotational axis thereof is directed downward, and the agitator 68 may be coupled to a lower portion of the motor 67. The motor may be used for a product in which a rotational speed varies. For example, a motor that has at least two different rotational speeds other than zero or that is capable of being linearly changed in rotational speed may be applied. The rotational speed of the agitator 68 may have at least two different rotational speeds other than zero according to the rotational speed of the motor 67 and also be capable of being linearly changed in rotational speed. As a result, it may be estimated that at least agitation performance of the agitator 68, i.e., performance of convective heat exchange, is changed.

The rotational speed of the motor 67 may operate through control of the control assembly 80. The control assembly 80 may allow information input through the manipulation part 40 to be stored in the memory and control the operation of the water purifier 1 on the basis of the information according to user's input specification.

The agitator 68 may rotate by the motor 67 and extend downward to be sunken in the cooling water. The agitator 68 may extend so that a lower end of the agitator 68 is disposed below the upper end of the cooling coil 64. Thus, when water forcibly flows by the agitator 68, the cooling water and the purified water within the cooling coil 64 may be actively heat-exchanged with each other.

A plurality of blades 681 is provided on the agitator 68. Each blade of the plurality of blades 681 may have a width that gradually increases downward. Particularly, each of the blades 681 has a shape that protrudes laterally from a lower end of the blade 681. A lower portion of the blade 681 may be inclined to be oriented in one direction. Thus, when the agitator 68 rotates, water of the inner case 611 forcibly flows downward. Thus, the circulation within the inner case 611 may be actively performed.

The blade 681 may be disposed to pass through the mesh member 65 so that the cooling water is circulated while passing through the mesh member 65 when the blade 681 is driven.

Hereinafter, a method for controlling the water purifier 1 will be described.

A main object of a method for controlling a water purifier 1 according to an embodiment is to control a convective heat transfer amount between the cooling water and the cooling coil 64 by controlling the speed of the agitator 68.

The convective heat transfer relationship is given by $Q=hA\Delta T$. Here, $Q$ [W] is a heat transfer amount between the cooling water and the purified water at room temperature, $h$ [W/m$^{2\circ}$ C.] is a convective heat transfer coefficient between the cooling water and the cooling coil 64, A [m$^2$] is a heat transfer area, and $\Delta T$[° C.] is a temperature difference between the cooling water and the purified water having room temperature. If the reference symbol Q is set to a level corresponding to the heat transfer amount Qc that is necessary for making the purified water having room temperature into cold water, the purified water becomes the cold water. Three methods may be proposed for the cold water producing method.

In the first cold water producing method, when the cooling water has a temperature less than a first set or predetermined temperature T_low (e.g., about 6° C.) used to control the agitator 68, cold water may be discharged in a state in which the agitator 68 is turned off. In this case, cold air of the cooling water may be preserved, and the cold water having an appropriate temperature may be discharged through natural convective heat transfer. That is to say, in this case, since a temperature difference $\Delta T$ between the cooling water and the purified water is sufficiently large, even though the convective heat transfer coefficient h between the cooling water and the cooling coil 64 is small, sufficient heat transfer may occur. In this case, heat generated due to momentum of the agitator 68 may be reduced when the agitator 68 is off. Thus, it is advantageous in terms of power consumption to leave the agitator 68 off.

In the second cold water producing method, when the cooling water has a temperature greater than the first set temperature T_low (e.g., about 6° C.) for the agitator 68 and less than a second set or predetermined temperature T_high (e.g., about 12° C.) used to control the agitator 68, the agitator 68 may be driven at a low rotational speed (low RPM) to discharge cold water. In this case, the cold air of the cooling water may be lost less due to the weak forced convective heat transfer, and thus, the cold water may be discharged at an appropriate temperature. That is to say, in this case, since a temperature difference $\Delta T$ between the cooling water and the purified water has a middle or moderate level, the convective heat transfer coefficient h between the cooling water and the cooling coil 64 may have the middle or moderate level to realize sufficient heat transfer.

In the third cold water producing method, when the cooling water has a temperature greater than the second set temperature T_high (e.g., about 12° C.) for the agitator 68, the agitator 68 may be driven at a high rotational speed (high RPM) to discharge cold water. In this case, the heat exchange between the cooling water and the cooling coil 64 may maximally increase due to the strong forced convective heat transfer. That is to say, the cold air of the cooling water may be maximally used to discharge the cold water having the lowest possible temperature at the corresponding temperature of the cooling water. In a convective heat transfer relationship, since a temperature difference $\Delta T$ between the cooling water and the purified water is small, the convective heat transfer coefficient h between the cooling water and the cooling coil 64 may be maximized to realize sufficient heat transfer.

A method for controlling the water purifier 1 to which the cold water producing methods according to an embodiment will be described.

<Method for Controlling Water Purifier According to First Embodiment>

FIG. 6 is a flowchart for explaining a method for controlling a water purifier.

Referring to FIG. 6, a cold water temperature mode is set (S1). The cold water temperature mode may include a minimum temperature mode and an appropriate temperature mode. The cold water temperature mode may be selected by a consumer and be used to control an operation of an agitator 68 that will be described later. The cold water temperature mode may be set by a button of a manipulation part or user interface 40.

The cold water temperature mode may be input through the manipulation part 40 and then stored in a memory of a control assembly or controller 80 so as to be referenced to an operation of the water purifier 1.

Thereafter, a temperature Tc of the cooling water is measured.

After the cold water temperature mode setting process and the cold water temperature measurement are performed, a process of controlling an operation of a compressor 51 is performed.

In the process of controlling the operation of the compressor 51, a temperature Tc of the cooling water and a first reference or predetermined temperature Ton used to control the compressor 51 at which the operation of the compressor 51 is started are compared to each other (S3). If the temperature Tc of the cooling water is higher as the result of the comparison, the compressor 51 operates at a low frequency, and an agitator 68 operates at a low RPM (S4). When the temperature Tc of the cooling water decreases and thus is less than a second reference or predetermined temperature Toff used to control the compressor 51 at which the operation of the compressor 51 is stopped, the compressor 51 is stopped, and the agitator 68 is stopped.

The first reference temperature Ton for the compressor 51 and the second reference temperature Toff for the compressor 51 may be changed according to a mounted position of a cold water temperature sensor 601 that measures the temperature Tc of the cooling water. However, it is clear that the temperature Tc of the cooling water is maintained in a constant range due to the above-described operation.

The process of controlling the operation of the compressor 51 is a process of maintaining the temperature Tc of the cooling water. Here, the compressor 51 operates at a low frequency, and also, the agitator 68 operates a low RPM. Thus, noise may be reduced, and power consumption may be reduced. In the process of controlling the operation of the compressor 51, purified water within a conduit of the cooling coil 64 may become cold water in a cold state.

A water discharge or dispensing button 41 may be operated by the consumer at a certain time (S7). The water discharge button 41 may be provided in the manipulation part 40. When the water discharge button 41 operates, the control of the operation of the agitator 68 is performed. The control of the operation of the agitator 68 is performed first according to a mode that is set in the cold water temperature mode setting process (S1). When the water discharge button 41 operates, the cold water has to be quickly supplied in a state that is desired by the consumer at the present time.

First, it is determined whether the set mode is the minimum temperature mode (S8). When it is determined that the set mode is the minimum temperature mode, the user desires cold water having a temperature as low as possible. Here, the agitator 68 rotates at a high speed to maximize heat-exchange between the cooling water and the cooling coil 64 (S9). In this case, the temperature of the supplied cold water may quickly decrease by instantly maximizing the heat-exchange between the cooling water and the cooling coil 64, which could otherwise be insufficient.

The control mode utilizes the third cold water producing method and may be understood that the heat-exchange between the cooling water and the cooling coil 64, which could otherwise be insufficient, is maximized.

When the set mode is not the minimum temperature mode, the appropriate temperature mode may be performed.

When the appropriate temperature mode is performed, it is determined whether the temperature Tc of the cooling water is less than a first set or predetermined temperature T_low (e.g., about 6° C.) used to control the agitator 68 (S10). When it is determined that the temperature Tc of the cooling water is less than the first set temperature T_low for the agitator 68, the agitator 68 is turned off (S11). Here, the temperature difference between the cooling water and the purified water to be cooled may be sufficiently large, and thus, even though the agitator 68 does not operate, the cold water may be sufficiently supplied.

The control mode utilizes the first cold water producing method. Thus, the cold water may be supplied while minimizing power consumption.

In another case, when it is determined that the temperature Tc of the cooling water is greater than the first set temperature T_low (e.g., about 6° C.) for the agitator 68 and less than a second set or predetermined temperature T_high (e.g., about 12° C.) for the agitator 68 (S12), the agitator 68 is turned on so that the agitator 68 operates at a low rotational speed (S13).

The control mode utilizes the second cold water producing method. Thus, the cold water may be sufficiently supplied while reducing the power consumption.

In further another case, when it is determined that the temperature Tc of the cooling water is greater than the second set temperature T_high (e.g., about 12° C.) for the agitator 68 (S12), the agitator 68 is turned on so that the agitator operates at a high rotational speed (S14). Here, the temperature difference between the cooling water and the purified water to be cooled may be small, and thus, the agitator 68 maximally operate to quickly cool the purified water.

The control mode utilizes the third cold water producing method. Thus, it gives priority to supply of the cold water at a level that is satisfied by the consumer even though the expense of the power consumption occurs.

The control of the operation of the agitator 68 is performed according to the temperature Tc of the cooling water and a selection mode of the consumer so that the cold water is discharged (S15). After the discharging or dispensing of the cold water is finished (S16), the process is returned to the initial state (S17).

According to the method for controlling the water purifier 1, the agitator 68 may be controlled to control the temperature of the cold water to be discharged, thereby optimally supplying the cold water having the temperature desired by the consumer and also reducing the power consumption.

<Method for Controlling Water Purifier According to Second Embodiment>

FIG. 7 is a flowchart for explaining a method for controlling a water purifier in which a compressor is controlled together when an operation of an agitator is controlled. In description of FIG. 7, the description of FIG. 6 is applied at it is to the same parts as those of FIG. 6. This embodiment has one feature in which an operation of a compressor is determined when an operation of an agitator is controlled.

Referring to FIG. 7, the operation of the compressor 51 is controlled, and a water discharge button 41 operates by a consumer at a certain time (S7). When the water discharge button 41 operates, the control of the operation of the agitator 68 is performed. The control of the operation of the agitator 68 is performed first according to a mode that is set in the cold water temperature mode setting process (S1). When the water discharge button 41 operates, the cold water has to be quickly supplied in a state that is desired by the consumer at the present time.

First, it is determined whether the set mode is the minimum temperature mode (S8). When it is determined as the minimum temperature mode, the user desires cold water having a temperature as low as possible. Here, the agitator 68 rotates at a high speed to maximize heat-exchange between the cooling water and the cooling coil 64 (S9). In this case, the temperature of the supplied cold water may quickly decrease by instantly maximizing the heat-exchange between the cooling water and the cooling coil 64, which could otherwise be insufficient.

The control mode utilizes the third cold water producing method and may be understood that the heat-exchange between the cooling water and the cooling coil 64, which could otherwise be insufficient, is maximized.

When the set mode is not the minimum temperature mode, the appropriate temperature mode may be performed.

When the appropriate temperature mode is performed, it is determined whether the temperature Tc of the cooling water is less than a first set temperature T_low (e.g., about 6° C.) (S10). When it is determined that the temperature Tc of the cooling water is less than the first set temperature T_low, the agitator 68 is turned off, and also, the compressor 51 is turned off (S21). Here, the temperature difference between the cooling water and the purified water to be cooled may be sufficiently large, and thus, even though the agitator 68 does not operate, the cold water may be sufficiently supplied.

The control mode utilizes the first cold water producing method. Thus, the cold water may be supplied while minimizing power consumption.

In another case, when it is determined that the temperature Tc of the cooling water is greater than the first set temperature T_low (e.g., about 6° C.) and less than a second set temperature T_high (e.g., about 12° C.) (S12), the agitator 68 is turned on so that the agitator 68 operates at a low rotational speed, and the compressor operates (S13). Here, since the temperature Tc of the cooling water has a level greater than a predetermined level, the compressor 51 may operate at a high frequency.

The control mode utilizes the second cold water producing method. Thus, the cold water may be sufficiently supplied while reducing the power consumption.

In further another case, when it is determined that the temperature Tc of the cooling water is greater than the second set temperature T_high (e.g., about 12° C.) (S12), the agitator 68 is turned on so that the agitator 68 operates a high rotational speed, and the compressor 51 operates (S14). Here, the temperature difference between the cooling water and the purified water to be cooled may be small, and thus, the agitator 68 may maximally operate to quickly cool the purified water. Also, since the temperature Tc of the cooling water has a level greater than a predetermined level, the compressor may operate at a high frequency.

The control mode utilizes the third cold water producing method. Thus, it gives priority to supply of the cold water at a level that is satisfied by the consumer even though the expense of the power consumption occurs.

The control of the operation of the agitator 68 is performed according to the temperature of the cooling water and a selection mode of the consumer so that the cold water is discharged (S15). After the discharging or dispensing of the cold water is finished (S16), the process is returned to the initial state (S17).

According to the method for controlling the water purifier according to this embodiment, the agitator 68 and the compressor are controlled together when the cold water is discharged, the cold water may more quickly reach the temperature desired by the consumer.

<Method for Controlling Water Purifier According to Third Embodiment>

FIG. 8 is a flowchart for explaining a method for controlling a water purifier in which a compressor is controlled after an operation of an agitator is controlled. In description of FIG. 8, the description of FIG. 6 is applied at it is to the same parts as those of FIG. 6. This embodiment has one feature in which an operation of a compressor is determined after a control of an operation of an agitator is determined. This embodiment may be applied when a large amount of water is continuously discharged or dispensed.

Referring to FIG. 8, the operation of the compressor 51 is controlled, and a water discharge button 41 operates by a consumer at a certain time (S7). When the water discharge button 41 operates, the control of the operation of the agitator 68 is performed. The control of the operation of the agitator 68 is performed first according to a mode that is set in the cold water temperature mode setting process (S1). When the water discharge button 41 operates, the cold water has to be quickly supplied in a state that is desired by the consumer at the present time.

First, it is determined whether the set mode is the minimum temperature mode (S8). When it is determined that the set mode is the minimum temperature mode, the user desires cold water having a temperature as low as possible. Here, the agitator 68 rotates at a high speed to maximize heat-exchange between the cooling water and the cooling coil 64 (S9). In this case, the temperature of the supplied cold water may quickly decrease by instantly maximizing the heat-exchange between the cooling water and the cooling coil 64, which may be possible to be insufficient.

The control mode utilizes the third cold water producing method and may be understood that the heat-exchange between the cooling water and the cooling coil 64, could otherwise be insufficient, is maximized.

When the set mode is not the minimum temperature mode, the appropriate temperature mode may be performed.

When the appropriate temperature mode is performed, it is determined whether the temperature Tc of the cooling water is less than a first set temperature T_low (e.g., about 6° C.) (S10). When it is determined that the temperature Tc of the cooling water is less than the first set temperature T_low, the agitator 68 is turned off (S11). Here, the temperature difference between the cooling water and the purified water to be cooled and/or the cooling coil 64 may be sufficient large, and thus, even though the agitator 68 does not operate, the cold water may be sufficiently supplied.

The control mode utilizes the first cold water producing method. Thus, the cold water may be supplied while minimizing power consumption.

In another case, when it is determined that the temperature Tc of the cooling water is greater than the first set temperature T_low (e.g., about 6° C.) and less than a second set temperature T_high (e.g., about 12° C.) (S12), the agitator 68 is turned on so that the agitator 68 operates at a low rotational speed (S13).

The control mode utilizes the second cold water producing method. Thus, the cold water may be sufficiently supplied while reducing the power consumption.

In further another case, when it is determined that the temperature Tc of the cooling water is greater than the second set temperature T_high (e.g., about 12° C.) (S12), the agitator 68 is turned on so that the agitator operates a high rotational speed (S14). Here, the temperature difference between the cooling water and the purified water to be cooled and/or the cooling coil 64 may be small, and thus, the agitator 68 maximally operate to quickly cool the purified water.

The control mode utilizes the third cold water producing method. Thus, it gives priority to supply of the cold water at a level that is satisfied by the consumer even though the expense of the power consumption occurs.

The control of the operation of the agitator 68 is performed according to the temperature of the cooling water and a selection mode of the consumer so that the cold water is discharged (S15).

A temperature Tc of the cooling water while the cold water is discharged or dispensed is measured (S31), and the control of the operation of the compressor 51 is performed again. In the control of the operation of the compressor 51, the temperature Tc of the cooling water may be changed based on a fourth reference or predetermined temperature Toff2 (e.g., about 4° C.) used to control the compressor 51 and a third reference or predetermined temperature Ton2 (e.g., about 6° C.) used to control the compressor 51.

This will be described in detail. When it is determined that the temperature Tc of the cooling water is less than the fourth reference temperature Toff2 (S32), the compressor 51 is turned off (S33). This case may be a case in which the temperature Tc of the cooling water is sufficiently low, a water discharge or dispensing flow rate is still small, the number of cups into which the water is discharged is sufficiently low, or a water discharge time is sufficiently short, and thus it is unnecessary to allow the compressor 51 to operate. The agitator 68 may be maintained in the previous operating state. The water discharge flow rate, the number of cups into which the water is discharged, and the water discharge time may be called temperature-related information of the cooling water that is related to the temperature Tc of the cooling water. This is done because it is assumed that the more the water discharge flow rate increases, the more the number of cups into which water is discharged increases, and the more the water discharge time increases, the more an amount of discharged water increases, and thus, the temperature Tc of the cooling water increases.

When it is determined that the temperature Tc of the cooling water is greater than the third reference temperature Ton2 (S34), the compressor 51 operates (S35). This case may be a case in which the temperature Tc of the cooling water is sufficiently high, the water discharge flow rate is high, or the water discharge time is significantly long, and thus, the compressor 51 may operate. The agitator 68 may be turned on to prevent ice from being made in an evaporator 63.

When it is determined that the temperature Tc of the cooling water is less than the third reference temperature Ton2 and greater than the fourth reference temperature Toff 2, the compressor 51 and the agitator 68 may be maintained in existing operation state.

According to this embodiment, even though a large amount of water is discharged by the user like the continuous water discharge, a sufficient level of the cold water may be obtained.

<Method for Controlling Water Purifier According to Fourth Embodiment>

FIG. 9 is a flowchart for explaining a method for controlling a water purifier according to the number of cups into which water is discharged.

FIG. 9 is a flowchart for explaining a method for controlling a water purifier in which the number of cups into which water is discharged is calculated to perform a control of an operation of an agitator. In description of FIG. 9, the description of FIG. 6 is applied at it is to the same parts as those of FIG. 6.

This embodiment is characterized by a method for controlling an operation of an agitator 68 to which a spotlighted feature that an amount of water to be dispensed at one time when the water purifier 1 is used is set to be supplied to the consumer is reflected. This embodiment may be applied when water is continuously discharged into a number of cups.

Referring to FIG. 9, an operation of the compressor 51 is controlled, and a water discharge button 41 operates by a consumer at a certain time (S7). When the water discharge button 41 operates, a control of the number of cups into which water is discharged is performed.

In the control of the number of cups into which water is discharged or dispensed, a time interval T between a time taken when water is discharged into the present cup and a time taken when water is discharged into the previous cup is calculated (S41), and then, the time interval T is compared to a set or predetermined time interval Ts (e.g., about one minute) (S42). If the time interval T is less than the set time interval Ts as the result of the comparison, it is determined that the consumer continuously discharges water, and the number Nw of cups into which water is discharged increases by one (S43). If the time interval T is greater than the set time interval Ts as the result of the comparison, it is determined that the consumer discharges water at a sufficient time interval, and the number Nw of cups into which water is set again to one (S44).

Thereafter, the control of the operation of the agitator 68 is performed. First, it is determined whether the set mode is the minimum temperature mode (S8). When it is determined that the set mode is the minimum temperature mode, the user desires cold water having a temperature as low as possible. Here, the agitator 68 rotates at a high speed to maximize heat-exchange between the cooling water and the cooling coil 64 (S9). In this case, the temperature of the supplied cold water may quickly decrease by instantly maximizing the heat-exchange between the cooling water and the cooling coil 64, which could otherwise be insufficient.

The control mode utilizes the third cold water producing method and may be understood that the heat-exchange between the cooling water and the cooling coil 64, could otherwise be insufficient, is maximized.

When the set mode is not the minimum temperature mode, the appropriate temperature mode may be performed.

When the appropriate temperature mode is performed, it is determined whether the number Nw of cups into which water is discharged or dispensed is less than a first set or predetermined water discharge number N_low (e.g., three cups) (S45). As the result of the determination, when the number Nw of cups is less than the first set water discharge number N_low, the agitator 68 is turned off (S11). Here, since the number Nw of accumulated cups into which water is discharged is sufficient small, and thus, the water discharge flow rate is low, even though the agitator 68 does not operate, sufficient cold water may be supplied.

The control mode utilizes the first cold water producing method. Thus, the cold water may be supplied while minimizing power consumption.

In another case, when it is determined that the number Nw of cups into which water is discharged is greater than the first set water discharge number N_low and less than a second set water discharge number N_high (e.g., eight cups) (S47), the agitator 68 is turned on to operate at a low rotational speed (S13). Here, the accumulated number Nw of cups into which water is discharged gradually increases to increase in water discharge flow rate. Thus, it may be determined that the temperature of the cold water gradually increases.

The control mode utilizes the second cold water producing method. Thus, the cold water may be sufficiently supplied while reducing the power consumption.

In further another case, when it is determined that the number Nw of cups into which water is discharged is greater than the second set water discharge number N_high (e.g., eight cups) (S47), the agitator 68 is turned on to operate at a high rotational speed (S14). Here, this may be recognized as a state in which the cooling water and the cold water have to be quickly heat-exchanged because the water discharge flow rate is high.

The control mode utilizes the third cold water producing method. Thus, it gives priority to supply of the cold water at a level that is satisfied by the consumer even though the expense of the power consumption occurs.

The control of the operation of the agitator 68 is performed according to the temperature Tc of the cooling water and a selection mode of the consumer so that the cold water is discharged (S15). After the discharging of the cold water is finished (S16), the process is returned to the initial state (S17).

According to the method for controlling the water purifier 1, the cold water having the temperature desired by the consumer may be supplied, and the power consumption may be reduced on the basis of the accumulated number of cups Nw into which water is discharged.

In the performance of this embodiment, the compressor operation control in the second embodiment and the compressor operation control in the third embodiment may be applied together to quickly respond to the needs of the consumers according to the amount of discharged water.

<Method for Controlling Water Purifier According to Fifth Embodiment>

FIG. 10 is a flowchart for explaining a method for controlling a water purifier according to an accumulated water discharge or dispensing flow rate.

FIG. 10 is a flowchart for explaining a method for controlling a water purifier in which an accumulated water discharge flow rate is calculated to perform a control of an operation of an agitator. In description of FIG. 10, the description of FIG. 6 is applied at it is to the same parts as those of FIG. 6.

This embodiment is characterized by a method for controlling an operation of the agitator 68 by reflecting an amount of cold water that is continuously discharged or dispensed. Here, the case of the cold water that is continuously discharged may include a case in which the cold water is discharged at a predetermined time interval. This embodiment may be applied to a case in which the cold water is discharged into a water bottle.

Referring to FIG. 10, the operation of the compressor 51 is controlled, and a water discharge button 41 operates by a consumer at a certain time (S7). When the water discharge button 41 operates, a control of the water discharge flow rate is performed.

In the control or calculation of the water discharge flow rate, a time interval T between a current time taken to discharge water and a previous time taken to discharge water is calculated (S51), and then the time interval T is compared to a set or predetermined time interval Ts (e.g., about one minute) (S52). When the time interval T is less than the set time interval Ts as the result of the comparison, it is determined that the consumer continuously discharges water, and thus, an accumulated water discharge flow rate Fw increases by the sum of the previously accumulated water discharge flow rate Fw and the current accumulated water discharge flow rate F (S53). If the time interval T is greater than the set time interval Ts as the result of the comparison, it is determined that the consumer discharges water at a sufficient time interval, and the water discharge flow rate Fw is set again to zero (S54).

Thereafter, the control of the operation of the agitator 68 is performed. First, it is determined whether the set mode is the minimum temperature mode (S8). When it is determined that the set mode the minimum temperature mode, the user desires cold water having a temperature as low as possible. Here, the agitator 68 rotates at a high speed to maximize heat-exchange between the cooling water and the cooling coil 64 (S9). In this case, the temperature of the supplied cold water may quickly decrease by instantly maximizing the heat-exchange between the cooling water and the cooling coil 64, which could otherwise be insufficient.

The control mode utilizes the third cold water producing method and may be understood that the heat-exchange between the cooling water and the cooling coil 64, which may be possible to be insufficient, is maximized.

When the set mode is not the minimum temperature mode, the appropriate temperature mode may be performed.

When the appropriate temperature mode is performed, it is determined whether the water discharge flow rate Fw is less than a first set or predetermined water discharge flow rate F_low (e.g., about 400 cc) (S55). As the result of the determination, when the water discharge flow rate Fw is less than the first set water discharge flow rate F_low, the agitator 68 is turned off (S11). Here, the accumulated water discharge flow rate is sufficiently low, and thus, even though the agitator 68 does not operate, the cold water may be sufficiently supplied.

The control mode utilizes the first cold water producing method. Thus, the cold water may be supplied while minimizing power consumption.

In another case, when it is determined that the water discharge flow rate Fw is greater than the first set water discharge flow rate F_low and less than a second set or predetermined water discharge flow rate F_high (e.g., about 1,000 cc) (S57), the agitator 68 is turned on to operate at a low rotational speed (S13). Here, the accumulated water discharge flow rate gradually increases to increase. Thus, it may be determined that the temperature of the cold water gradually increases.

The control mode utilizes the second cold water producing method. Thus, the cold water may be sufficiently supplied while reducing the power consumption.

In further another case, when it is determined that the water discharge flow rate Fw is greater than a second set water discharge flow rate F_high (S57), the agitator 68 is turned on to operate at a high rotational speed (S14). Here, this may be recognized as a state in which the cooling water and the cold water have to be quickly heat-exchanged because the flow rate of discharged water is high.

The control mode utilizes the third cold water producing method. Thus, it gives priority to supply of the cold water at a level that is satisfied by the consumer even though the expense of the power consumption occurs.

The control of the operation of the agitator 68 is performed according to the temperature Tc of the cooling water and a selection mode of the consumer so that the cold water is discharged (S15). After the discharging of the cold water is finished (S16), the process is returned to the initial state (S17).

According to the method for controlling the water purifier, the cold water having the temperature desired by the consumer may be supplied, and the power consumption may be reduced on the basis of the water discharge flow rate.

In the performance of this embodiment, the compressor operation control in the second embodiment and the compressor operation control in the third embodiment may be applied together to quickly respond to the needs of the consumers according to the amount of discharged water.

<Method for Controlling Water Purifier According to Sixth Embodiment>

FIG. 11 is a flowchart for explaining a method for controlling a water purifier according to a water discharge accumulation time.

FIG. 11 is a flowchart for explaining a method for controlling a water purifier in which an accumulated water discharge time is calculated to perform a control of an operation of an agitator. In description of FIG. 11, the description of FIG. 6 is applied at it is to the same parts as those of FIG. 6.

This embodiment is characterized by a method for controlling an operation of the agitator by reflecting a water discharge time of cold water that is continuously discharged. Here, the case of the cold water that is continuously discharged may include a case in which the cold water is discharged at a predetermined time interval. This embodiment may be applied to a case in which the cold water is discharged into a water bottle.

Referring to FIG. 11, the operation of the compressor 51 is controlled, and a water discharge button 41 operates by a consumer at a certain time (S7). When the water discharge button 41 operates, a control of the water discharge time is performed.

In the control or calculation of the accumulation water discharge time, a time interval T between a current time taken to discharge water and a previous time taken to discharge water is calculated (S61), and then, the time interval T is compared to a set or predetermined time interval Ts (e.g., about one minute) (S62). When the time interval T is less than the set time interval Ts as the result of the comparison, it is determined that the consumer continuously discharges water, and thus, an accumulated water discharge time $\tau W$ increases by the sum of the current accumulated water discharge time τW and the current water discharge time T (S63). If the time interval T is greater than the set time interval Ts as the result of the comparison, it is determined that the consumer discharges water at a sufficient time interval, and the water discharge time τW is set again to zero (S64).

Thereafter, the control of the operation of the agitator 68 is performed. First, it is determined whether the set mode is the minimum temperature mode (S8). When it is determined as the minimum temperature mode, the user desires cold water having a temperature as low as possible. Here, the agitator 68 rotates at a high speed to maximize heat-exchange between the cooling water and the cooling coil 64 (S9). In this case, the temperature of the supplied cold water may quickly decrease by instantly maximizing the heat-exchange between the cooling water and the cooling coil 64, which could otherwise be insufficient.

The control mode utilizes the third cold water producing method and may be understood that the heat-exchange between the cooling water and the cooling coil 64, which could otherwise be insufficient, is maximized.

When the set mode is not the minimum temperature mode, the appropriate temperature mode may be performed.

When the appropriate temperature mode is performed, it is determined whether the water discharge time τW is less than a first set or predetermined water discharge time τ_low (e.g., about 25 seconds) (S65). As the result of the determination, when the water discharge time τW is less than the first set water discharge time τ_low, the agitator 68 is turned off (S11). Here, the accumulated water discharge time is sufficiently small, and thus, even though the agitator 68 does not operate, the cold water may be sufficiently supplied.

The control mode utilizes the first cold water producing method. Thus, the cold water may be supplied while minimizing power consumption.

In another case, when it is determined that the water discharge time τW is greater than the first set water discharge time τ_low and less than a second set or predetermined water discharge time τ_high (e.g., about 60 seconds) (S67), the agitator 68 is turned on to operate at a low rotational speed (S13). Here, the accumulated water discharge time gradually increases to increase. Thus, it may be determined that the temperature of the cold water gradually increases.

The control mode utilizes the second cold water producing method. Thus, the cold water may be sufficiently supplied while reducing the power consumption.

In further another case, when it is determined that the water discharge time τW is greater than a second set water discharge time τ_high (S67), the agitator 68 is turned on to operate at a high rotational speed (S14). Here, this may be recognized as a state in which the cooling water and the cold water have to be quickly heat-exchanged because the water discharge flow rate is high.

The control mode utilizes the third cold water producing method. Thus, it gives priority to supply of the cold water at a level that is satisfied by the consumer even though the expense of the power consumption occurs.

The control of the operation of the agitator 68 is performed according to the temperature of the cooling water and a selection mode of the consumer so that the cold water is discharged (S15). After the discharging of the cold water is finished (S16), the process is returned to the initial state (S17).

According to the method for controlling the water purifier, the cold water having the temperature desired by the consumer may be supplied, and the power consumption may be reduced on the basis of the water discharge time.

In the performance of this embodiment, the compressor operation control in the second embodiment and the compressor operation control in the third embodiment may be applied together to quickly respond to the needs of the consumers according to the amount of discharged water.

FIG. 12 is a graph illustrating results obtained by performing a simulation in which the method for controlling the water purifier 1 is applied according to an embodiment. Experimental conditions are as follows: a cooling water flow rate is about 1600 g, an initial cooling water temperature is Tc=1° C., a temperature of supplied purified water is about 25° C., an amount of one cup is about 120 cc, a time taken to discharge water into one cup is about 8 seconds, a water discharge period is about 15 seconds, and a water discharge time interval is about 7 seconds.

Also, a convective heat transfer coefficient is h [W/m$^{2°}$ C.], and when the agitator 68 is turned off, a temperature of the cooling water is less than about 6° C., and a natural convection coefficient of water is about 200. In the case in which the agitator 68 operates, when the agitator 68 operates at a low RPM, the low RPM was about 400 in a cooling water temperature range of about 6° C. to about 10° C., and when the agitator 68 operates at a high RPM, the high RPM was about 600 in a cooling water temperature range of about 10° C. or more.

Referring to FIG. 12, when the agitator 68 operates at only the high RPM, it was seen that a temperature deviation is large as a temperature range of about 9.21° C., i.e., between about 5.56° C. to about 14.77° C. When the agitator 68 operates at only the low RPM, it was seen that a temperature deviation is large as a temperature range of about 7° C., i.e., between about 8.2° C. to about 15.2° C. When the agitator 68 operates only in the turn-off state, it was seen that a temperature deviation is small as a temperature range of about 4.18° C., i.e., between 12.07° C. to about 16.25° C., but it is difficult to obtain a satisfied cold water temperature because a water discharge temperature increases.

When the agitator 68 is controlled depending on the cooling water temperature Tc according to the embodiment, a temperature deviation is small as a temperature range of about 2.55° C., i.e., between about 10.82° C. to about 13.36° C. Therefore, even though the water is continuously discharged, the consumer may obtain the cold water having the satisfactory level.

INDUSTRIAL APPLICABILITY

According to the embodiments, the rotational speed of the agitator may be adjusted to positively cope with the cold water temperature, and thus, the satisfaction of the user may be further enhanced, thereby further enhancing the satisfaction of the user to the water purifier.

SEQUENCE LIST TEXT

Agitator: 68

The invention claimed is:

1. A method to control a liquid dispenser, comprising:
   sensing that a liquid discharge button has been selected;
   when temperature-related information of a first liquid stored in a tank is less than a first critical value, performing a first mode in which an agitator is stopped, the agitator being configured to agitate the first liquid;
   when the temperature-related information of the first liquid is greater than the first critical value but less than a second critical value that is greater than the first critical value, performing a second mode in which the agitator is rotated at a first rotational speed;

when the temperature-related information is greater than the second critical value, performing a third mode in which the agitator is rotated at a second rotational speed that is greater than the first rotational speed; and dispensing a second liquid where heat-exchange has occurred with the first liquid stored in the tank.

2. The method according to claim 1, wherein a user interface to receive a user's command is provided in a case of the liquid dispenser, and the user interface has a mode selection button configured to select one of a minimum temperature mode and a general liquid temperature mode, the minimum temperature mode being a mode in which the second liquid is cooled by a maximum amount and the general liquid temperature mode being a mode in which the second liquid is cooled to have a temperature within a predetermined temperature range.

3. The method according to claim 2, wherein, when the minimum temperature mode is selected via the mode selection button, the agitator is rotated at a speed that is greater than the first rotational speed regardless of the value of the temperature-related information.

4. The method according to claim 1, further comprising, before sensing a selection of the water discharge button:
measuring a temperature of the first liquid; and
when the temperature of the first liquid is greater than a first predetermined temperature, operating a compressor at a first frequency and rotating the agitator at a speed less than the second rotational speed.

5. The method according to claim 4, further comprising turning off the compressor and the agitator when the temperature of the first liquid is less than a second predetermined temperature less than the first predetermined temperature.

6. The method according to claim 1, wherein a compressor is provided that is stopped in the first mode and operated in the second mode and the third mode.

7. The method according to claim 1, further comprising:
measuring the temperature of the first liquid after dispensing of the second liquid starts; and
maintaining or converting the operations of a compressor and the agitator on the basis of the measured temperature of the first liquid.

8. The method according to claim 7, further comprising:
turning off the compressor when the temperature of the first liquid is less than a third predetermined temperature;
operating the compressor and the agitator when the temperature of the first liquid is greater than a fourth predetermined temperature greater than the third predetermined temperature; and
maintaining the current operation states of the compressor and the agitator when the temperature of the first liquid is between the third and fourth predetermined temperatures.

9. The method according to claim 8, wherein the selected operations of the compressor and the agitator are performed until the dispensing of the second liquid is completed.

10. The method according to claim 1, wherein the temperature-related information is a temperature of the first liquid, which is measured by a temperature sensor,
the first critical value is a fifth predetermined temperature, and
the second critical value is a sixth predetermined temperature.

11. The method according to claim 1, wherein the temperature-related information is the number of cups into which the second liquid is continuously dispensed within a predetermined time interval,
the first critical value is a first predetermined number of times the second liquid is dispensed, and
the second critical value is a second predetermined number of times the second liquid is dispensed.

12. The method according to claim 1, wherein the temperature-related information is a flow rate of the second liquid continuously dispensed within a predetermined time interval,
the first critical value is a first predetermined flow rate, and
the second critical value is a second predetermined flow rate.

13. The method according to claim 1, wherein the temperature-related information is a time of when the second liquid is continuously dispensed within a predetermined time interval,
the first critical value is a first predetermined time, and
the second critical value is a second predetermined time.

14. A method for controlling a liquid dispenser, comprising:
measuring a temperature of a first liquid stored in a tank of the liquid dispenser;
operating a compressor at a low frequency to compress refrigerant and rotating an agitator at a low speed to agitate the first liquid when the temperature of the first liquid is greater than a first predetermined temperature;
turning off the compressor and the agitator when the temperature of the first liquid is less than a second predetermined temperature which is less than the first predetermined temperature, wherein a second liquid is configured to be purified or dispensed, and heat exchange has occurred with the first liquid; and
sensing whether a button to dispense the second liquid has been operated.

15. The method according to claim 14, further comprising, after the button has been operated:
when temperature-related information of the first liquid is less than a first critical value, performing a first mode in which the agitator is stopped,
when the temperature-related information of the first liquid is greater than the first critical value but less than a second critical value that is greater than the first critical value, performing a second mode in which the agitator is rotated at a first rotational speed,
when the temperature-related information is greater than the second critical value, performing a third mode in which the agitator is rotated at a second rotational speed greater than the first rotational speed, and
dispensing the second liquid.

16. The method according to claim 15, wherein the temperature-related information comprises at least one of:
a temperature of the first liquid, which is measured by a temperature sensor;
the number of cups into which the second liquid is continuously dispensed within a predetermined time interval;
a flow rate of the second liquid within a predetermined time interval; or
a dispensing time of the second liquid within a predetermined time interval.

17. The method according to claim 15, wherein the compressor is stopped in the first mode, and
the compressor operates in the second mode and the third mode.

* * * * *